(12) United States Patent
Asami

(10) Patent No.: US 7,830,620 B2
(45) Date of Patent: Nov. 9, 2010

(54) IMAGING LENS AND IMAGING APPARATUS

(75) Inventor: Taro Asami, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 0 days.

(21) Appl. No.: 12/561,664

(22) Filed: Sep. 17, 2009

(65) Prior Publication Data
US 2010/0085651 A1   Apr. 8, 2010

(30) Foreign Application Priority Data
Oct. 7, 2008 (JP) ............................ P2008-260271
Oct. 7, 2008 (JP) ............................ P2008-260272

(51) Int. Cl.
*G02B 9/62*   (2006.01)
(52) U.S. Cl. ...................... 359/761; 359/756
(58) Field of Classification Search ................ 359/682, 359/752, 754, 756, 761
See application file for complete search history.

(56) References Cited

FOREIGN PATENT DOCUMENTS

| | | | |
|---|---|---|---|
| JP | 55-45007 A | 3/1980 | |
| JP | 61-90115 A | 5/1986 | |
| JP | 9-230232 A | 9/1997 | |
| JP | 2005-164839 A | 6/2005 | |
| JP | 2007-206331 A | 8/2007 | |
| JP | 2008-287045 A | 11/2008 | |

*Primary Examiner*—Jack Dinh
(74) *Attorney, Agent, or Firm*—Birch, Stewart, Kolasch & Birch, LLP

(57) ABSTRACT

An imaging lens includes a first lens having a negative power and including a concave surface facing an image side, a second lens having a positive power, a third lens having a positive power, an aperture diaphragm, a fourth lens, which is a biconvex lens having a negative power, a fifth lens having a positive power and including a convex surface facing the image side, and a sixth lens having a positive power and including a convex surface facing an object side, which are arranged in this order from the object side. The Abbe number of a material forming the fourth lens with respect to the d-line is 30 or less. When the focal length of the entire lens system is f and a composite focal length from the fourth lens to the sixth lens is f456, the imaging lens satisfies following conditional expression:

$1.00 < f456/f < 1.88$.

19 Claims, 15 Drawing Sheets

EXAMPLE 1

EXAMPLE 2

EXAMPLE 3

EXAMPLE 4

EXAMPLE 5

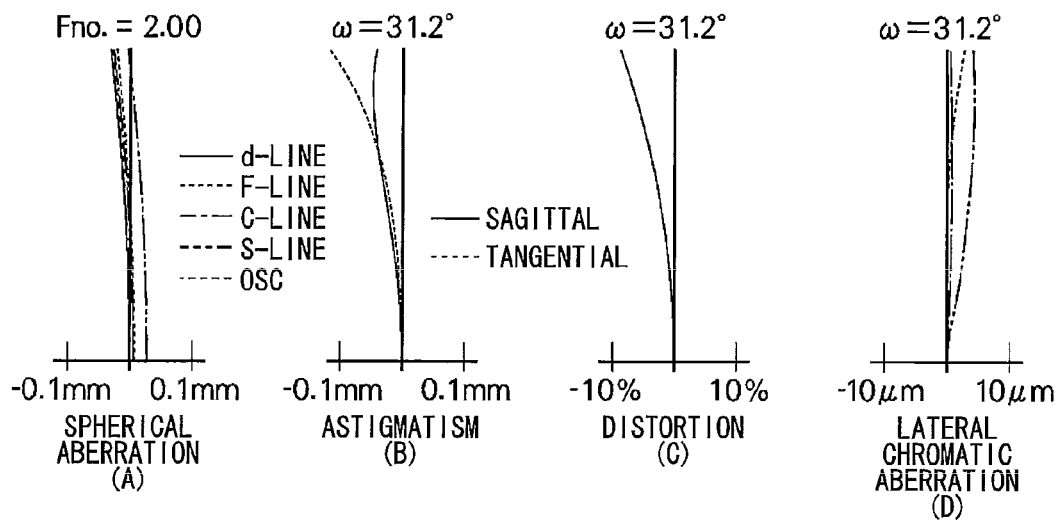
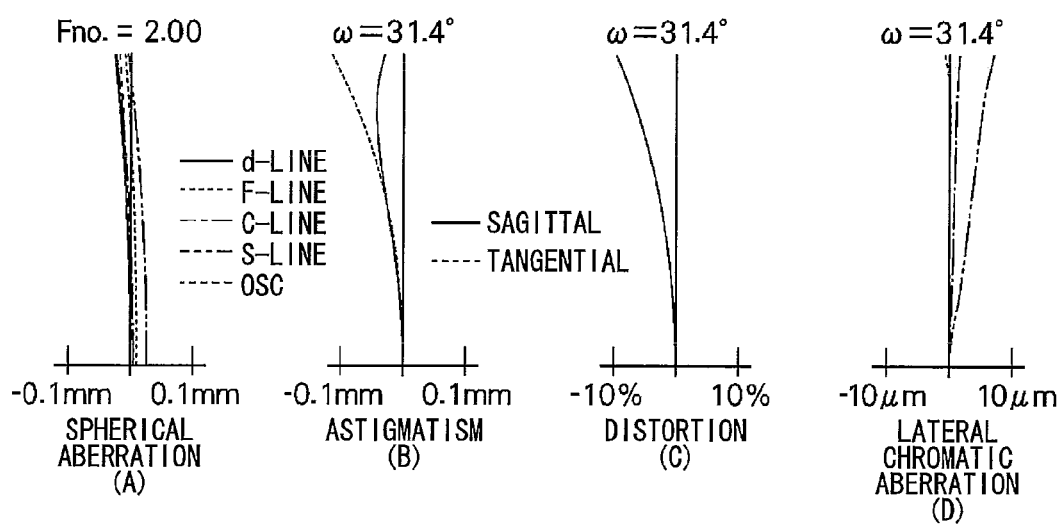

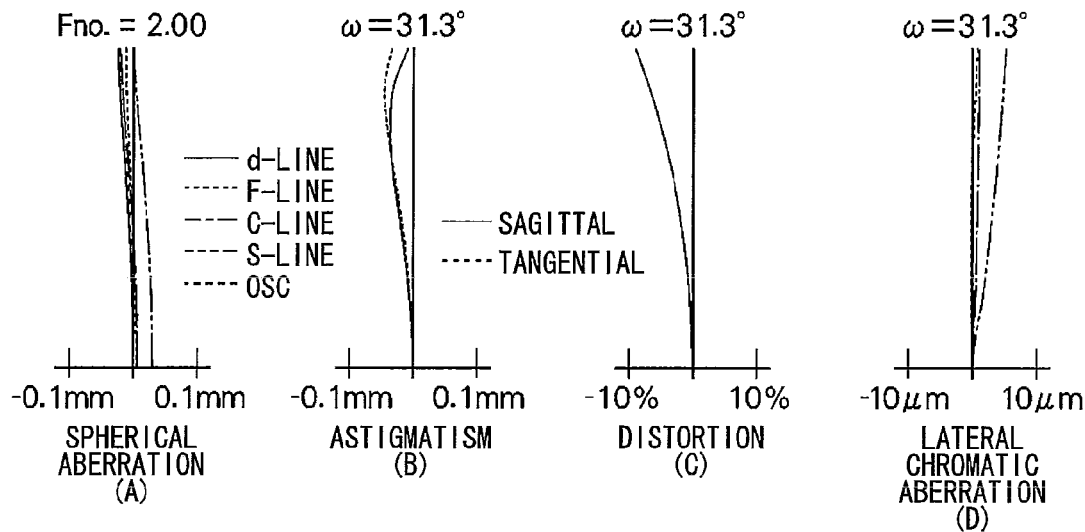
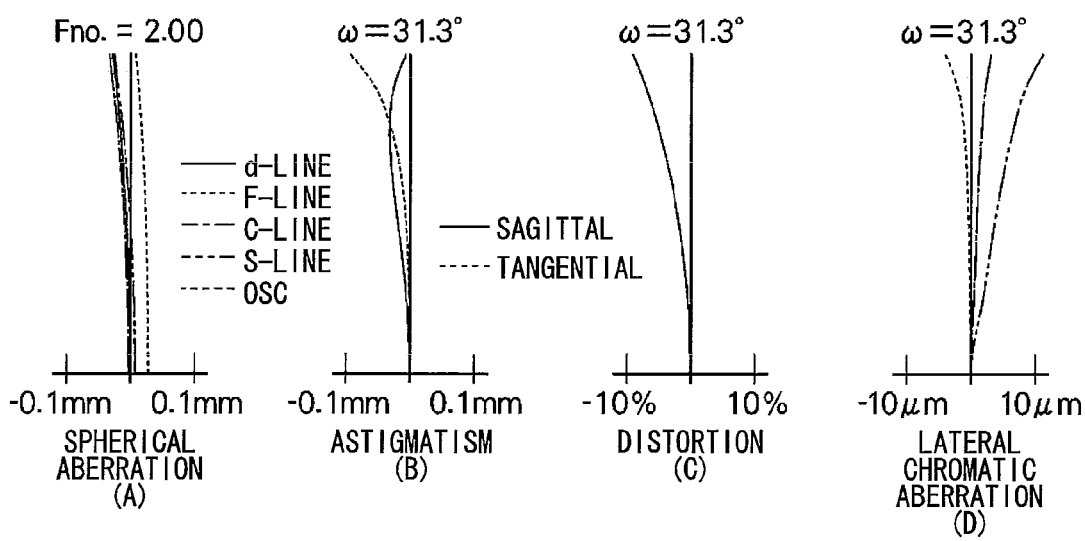

EXAMPLE 5

EXAMPLE 6

EXAMPLE 7

EXAMPLE 8

EXAMPLE 9

EXAMPLE 10

EXAMPLE 11

EXAMPLE 12

EXAMPLE 6

EXAMPLE 7

EXAMPLE 8

EXAMPLE 9

EXAMPLE 10

EXAMPLE 11

EXAMPLE 12

IMAGING LENS AND IMAGING APPARATUS

CROSS-REFERENCE TO RELATED APPLICATIONS

This application is based upon and claims the benefit of priority from Japanese Patent Application Nos. 2008-260271 and 2008-260272 filed on Oct. 7, 2008; the entire contents of which are incorporated herein by reference.

BACKGROUND OF THE INVENTION

1. Field of the Invention

The present invention relates to an imaging lens and an imaging apparatus, and more particularly, to an imaging lens suitable for, for example, an in-vehicle camera, a mobile terminal camera, or a monitoring camera using an imaging device, such as a CCD (charge coupled device) or a CMOS (complementary metal oxide semiconductor), and an imaging apparatus including the imaging lens.

2. Description of the Related Art

In recent years, the size of an imaging device, such as a CCD or a CMOS, has been reduced, and the number of pixels thereof has increased. In addition, the size of the imaging apparatus including the imaging device has been reduced. Therefore, it is necessary to improve the optical performance of an imaging lens provided in the imaging apparatus and to reduce the size and weight of the imaging lens.

Meanwhile, for example, an in-vehicle camera or a monitoring camera requires a high-performance lens that has high weather resistance, that can be used in a wide temperature range in a vehicle from a low temperature in a cold region to a high temperature in a tropical region, and that has a small size and a high performance. In particular, a camera that is provided in a vehicle and that monitors the front side thereof needs to have such a small F number that it can be used at night and be used in a wide wavelength band from a visible range to an infrared range. When the imaging apparatus is used as an in-vehicle camera, a small portion of a lens unit needs to be exposed in terms of the outward appearance of the vehicle.

JP-A-2008-287045 filed by the inventors discloses an imaging lens that can be used in the above-mentioned field. In addition, JP-A-55-45007, JP-A-61-90115, JP-A-9-230232, and JP-A-2005-164839 disclose imaging lenses each having a six-lens structure. The image lens disclosed in JP-A-55-45007 includes a negative lens, a positive lens, a positive lens, an aperture diaphragm, a negative lens, a positive lens, and a positive lens arranged in this order from an object side. The imaging lens disclosed in JP-A-61-90115 includes a negative lens, a positive lens, a positive lens, an aperture diaphragm, a negative lens, a positive lens, and a negative lens arranged in this order from an object side. The imaging lens disclosed in JP-A-9-230232 includes a negative lens, a positive lens, an aperture diaphragm, a positive lens, a negative lens, a positive lens, and a positive lens arranged in this order from an object side. The imaging lens disclosed in the JP-A-2005-164839 includes a negative lens, a positive lens, a positive lens, an aperture diaphragm, a negative lens, a positive lens, and a positive lens arranged in this order from an object side.

However, since it is considered that the in-vehicle camera or the monitoring camera is to be used at night, an optical system having a small F number is required. However, the imaging lenses disclosed in JP-A-55-45007 and JP-A-61-90115 have a large F number in the range of 3.3 to 4.5 and become so-called slow optical systems, which is not preferable. Since the imaging lens disclosed in JP-A-2005-164839 has an F number of 2.5, the F number of the imaging lens needs to be reduced. In addition, since an aspheric lens is used, the imaging lens has a high manufacturing cost.

The imaging lens disclosed in JP-A-2008-287045 has an angle of view of about 27°. Therefore, it is preferable to increase the angle of view of the imaging lens in order to use it for an in-vehicle camera or a monitoring camera.

SUMMARY OF THE INVENTION

The invention has been made in order to solve the above-mentioned problems, and an object of the invention is to provide an imaging lens that has a wide angle of view, a small size, a small F number, a low manufacturing cost, and a high optical performance, and an imaging apparatus including the imaging lens.

(First Aspect)

According to a first aspect of the invention, an imaging lens includes: a first lens that has a negative power and includes a concave surface facing an image side; a second lens having a positive power; a third lens having a positive power; an aperture diaphragm; a fourth lens that is a biconcave lens having a negative power; a fifth lens that has a positive power and includes a convex surface facing the image side; and a sixth lens that has a positive power and includes a convex surface facing an object side. The first to sixth lenses are arranged in this order from the object side. The absolute value of the curvature radius of an object-side surface of the second lens may be greater than that of the curvature radius of an image-side surface thereof. The Abbe number of a material forming the fourth lens with respect to the d-line is equal to or less than 30. When the focal length of the entire lens system is f and a composite focal length from the fourth lens to the sixth lens is f456, the imaging lens satisfies the following Conditional expression 1:

$$1.00 < f456/f < 1.88. \qquad \text{[Conditional expression 1]}$$

According to the imaging lens of the first aspect of the invention, it is possible to obtain an optical system having a wide angle of view, a small size, a small F number, and a high optical performance by appropriately selecting the structure of each lens, as described above. In addition, since an aspheric surface is not necessarily used, it is possible to reduce manufacturing costs. Further, in the imaging lens according to the first aspect of the invention, since the Abbe number of the fourth lens that is arranged in the vicinity of the aperture diaphragm and has a strong negative power is equal to or less than 30, it is possible to effectively reduce chromatic aberration. In addition, since the imaging lens is configured so as to satisfy Conditional expression 1, it is easy to correct distortion and field curvature and it is possible to increase the angle of view.

In the imaging lens according to the first aspect of the invention, the absolute value of the curvature radius of an object-side surface of the third lens may be less than that of the curvature radius of an image-side surface thereof. The absolute value of the curvature radius of an object-side surface of the fifth lens may be greater than that of the curvature radius of an image-side surface thereof. The absolute value of the curvature radius of an object-side surface of the sixth lens may be less than that of the curvature radius of an image-side surface thereof. Any one of the above-mentioned relationships between the curvature radii of the object-side surface and the image-side surface of the second, third, fifth, and sixth lenses may be satisfied, or any combinations thereof may be satisfied.

It is preferable that the imaging lens according to the first aspect of the invention satisfy the following Conditional expressions 2 to 6. In addition, the imaging lens according to the first aspect of the invention may satisfy any one of the following Conditional expressions 2 to 6 or any combinations thereof:

$0.30<|R8/R9|<0.90$,  [Conditional expression 2]

$0.15<Bf/(L-Bf)<0.25$,  [Conditional expression 3]

$1.20<f5/f<1.50$,  [Conditional expression 4]

$0.3<D6/D7<1.2$, and  [Conditional expression 5]

$0.3<|f1/f2|<1.0$  [Conditional expression 6]

(where f indicates the focal length of the entire lens system, f1 indicates the focal length of the first lens, f2 indicates the focal length of the second lens, f5 indicates the focal length of the fifth lens, R8 indicates the curvature radius of an object-side surface of the fourth lens, R9 indicates the curvature radius of an image-side surface of the fourth lens, D6 indicates an air space between the third lens and the aperture diaphragm on the optical axis, D7 indicates an air space between the aperture diaphragm and the fourth lens on the optical axis, L indicates the distance from an object-side surface of a lens closest to the object side to the image surface on the optical axis (a back focal length is an air equivalent length), and Bf indicates the distance from an image-side surface of a lens closest to the image side to the image surface on the optical axis (an air equivalent length)).

In the case of an aspheric lens, the terms 'concave surface', 'convex surface', 'biconvex', 'biconcave', and 'curvature radius' are considered in a paraxial region.

(Second Aspect)

According to a second aspect of the invention, an imaging lens includes: a first lens that has a negative power and includes a concave surface facing an image side; a second lens that is a biconvex lens having a positive power; a third lens having a positive power; an aperture diaphragm; a fourth lens that is a biconcave lens having a negative power; a fifth lens that has a positive power and includes a convex surface facing the image side; and a sixth lens that has a positive power and includes a convex surface facing an object side. The first to sixth lenses are arranged in this order from the object side. The absolute value of the curvature radius of an object-side surface of the second lens is equal to or less than that of the curvature radius of an image-side surface thereof. The absolute value of the curvature radius of an object-side surface of the third lens is equal to or less than that of the curvature radius of an image-side surface thereof. The Abbe number of a material forming the second lens with respect to the d-line is equal to or greater than 45. The Abbe number of a material forming the fourth lens with respect to the d-line is equal to or less than 30.

According to the imaging lens of the second aspect of the invention, it is possible to obtain an optical system having a small size, a small F number, and a high optical performance by appropriately selecting the structure of each lens, as described above. In addition, since an aspheric surface is not necessarily used, it is possible to reduce manufacturing costs. In particular, in the imaging lens of the second aspect of the invention, when the object-side surface and the image-side surface of each of the second and third lenses are configured as described above, it is easy to correct spherical aberration and it is possible to obtain an optical system having a small F number. In addition, when the Abbe numbers of the second and fourth lenses are selected as described above, it is easy to correct chromatic aberration and it is possible to achieve a high optical performance.

In the imaging lens according to the second aspect of the invention, the first lens may be a biconcave lens. The absolute value of the curvature radius of an object-side surface of the first lens may be greater than that of the curvature radius of an image-side surface thereof. The absolute value of the curvature radius of an object-side surface of the fifth lens may be greater than that of the curvature radius of an image-side surface thereof. The absolute value of the curvature radius of an object-side surface of the sixth lens may be less than that of the curvature radius of an image-side surface thereof.

It is preferable that the imaging lens according to the second aspect of the invention satisfy the following Conditional expressions 11 to 17. In addition, the imaging lens according to the second aspect of the invention may satisfy any one of the following Conditional expressions 11 to 17 or any combinations thereof:

$0.30<f5/f6<0.95$,  [Conditional expression 11]

$0.50<f2/f3<1.80$,  [Conditional expression 12]

$0.5<R3/f<4.0$,  [Conditional expression 13]

$2.0<L/f<7.0$,  [Conditional expression 14]

$0.8<f5/f<1.6$,  [Conditional expression 15]

$0.3<|f1/f2|<1.0$, and  [Conditional expression 16]

$1.50<f456/f<2.50$  [Conditional expression 17]

(where f indicates the focal length of the entire lens system, f1 indicates the focal length of the first lens, f2 indicates the focal length of the second lens, f3 indicates the focal length of the third lens, f5 indicates the focal length of the fifth lens, f6 indicates the focal length of the sixth lens, f456 indicates a composite focal length from the fourth lens to the sixth lens, R3 indicates the curvature radius of an object-side surface of the second lens, and L indicates the distance from an object-side surface of a lens closest to the object side to the image surface on the optical axis (a back focal length is an air equivalent length)).

In the case of an aspheric lens, the terms 'concave surface', 'convex surface', 'biconvex', 'biconcave', and 'curvature radius' are considered in a paraxial region. In addition, when a lens surface is convex toward the object side, the curvature radius thereof has a positive value, and when the lens surface is convex toward the image side, the curvature radius thereof has a negative value.

In the imaging lens according to the second aspect of the invention, the refractive index of the material forming the second lens with respect to the d-line may be in the range of 1.65 to 1.9.

An imaging apparatus according to a third aspect of the invention includes the imaging lens according to the first or second aspect.

According to the imaging lens of the first aspect of the invention, in a lens system including at least six lenses, for example, the shape and power of each lens and the material forming each lens are appropriately set to satisfy Conditional expression 1. Therefore, it is possible to achieve an imaging lens having a wide angle of view, a small size, a small F number, a low manufacturing cost, and a high optical performance, and an image apparatus including the imaging lens.

According to the imaging lens of the second aspect of the invention, in a lens system including at least six lenses, for example, the shape and power of each lens and the material forming each lens are appropriately set. Therefore, it is possible to achieve an imaging lens having a small size, a small F number, a low manufacturing cost, and a high optical performance, and an image apparatus including the imaging lens.

BRIEF DESCRIPTION OF THE DRAWINGS

FIG. 7 is a diagram illustrating the aberrations of the imaging lens according to Example 1, in which (A) shows spherical aberration, (B) shows astigmatism, (C) shows distortion, and (D) shows lateral chromatic aberration;

FIG. 8 is a diagram illustrating the aberrations of the imaging lens according to Example 2, in which (A) shows spherical aberration, (B) shows astigmatism, (C) shows distortion, and (D) shows lateral chromatic aberration;

FIG. 9 is a diagram illustrating the aberrations of the imaging lens according to Example 3, in which (A) shows spherical aberration, (B) shows astigmatism, (C) shows distortion, and (D) shows lateral chromatic aberration;

FIG. 10 is a diagram illustrating the aberrations of the imaging lens according to Example 4, in which (A) shows spherical aberration, (B) shows astigmatism, (C) shows distortion, and (D) shows lateral chromatic aberration;

DESCRIPTION OF THE PREFERRED EMBODIMENTS

Hereinafter, exemplary embodiments of the invention will be described in detail with reference to the accompanying drawings. First, imaging lenses according to embodiments of the invention will be described, and then an imaging apparatus according to another embodiment of the invention will be described.

Figure 1:
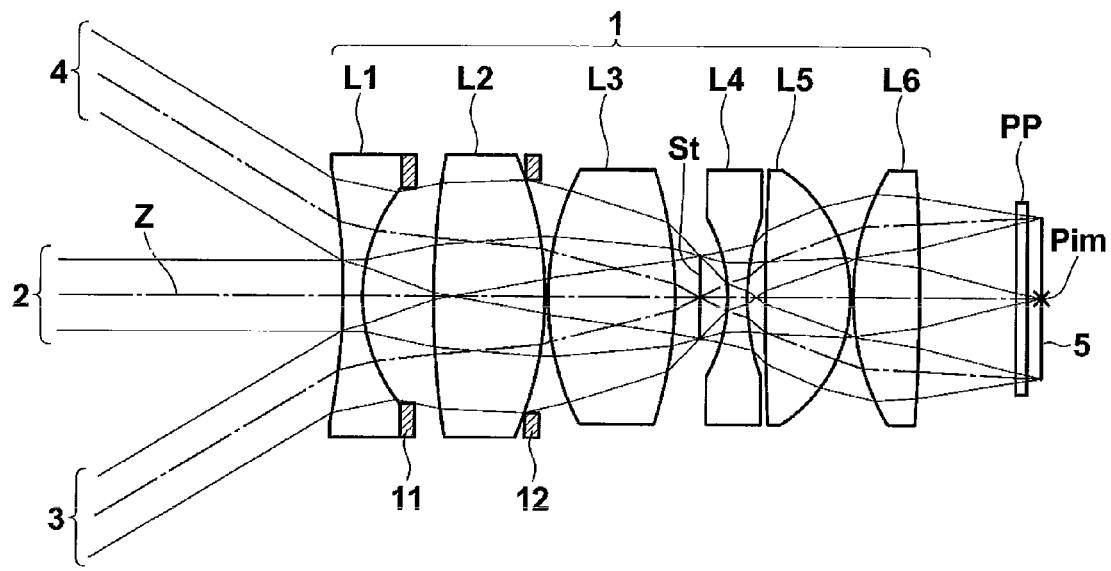
FIG. 1 is a diagram illustrating an optical path of an imaging lens according to an embodiment of the invention.
Figure 12:
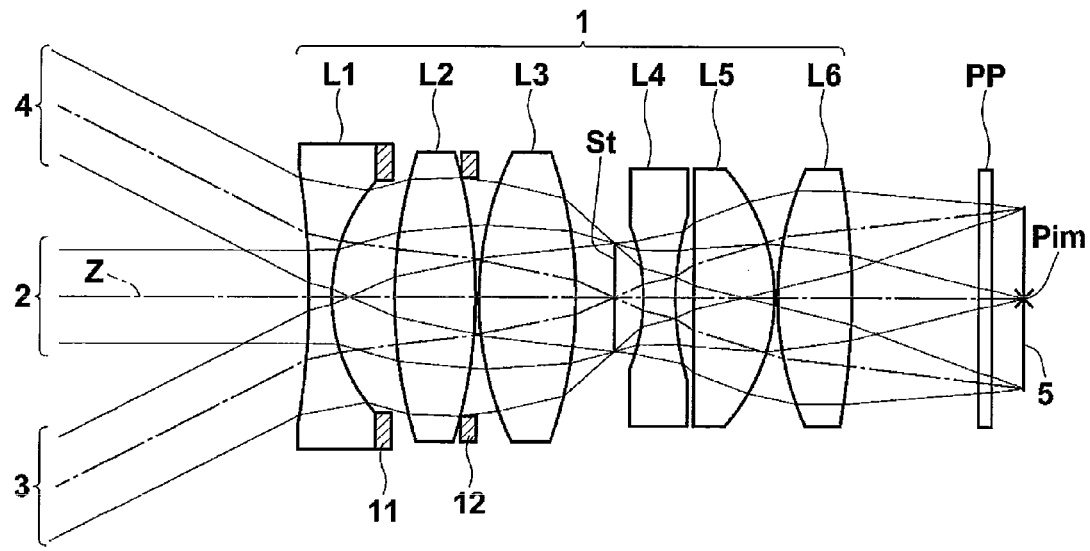
FIG. 12 is a diagram illustrating an optical path of an imaging lens according to another embodiment of the invention.

FIGS. 1 and 12 are cross-sectional views illustrating an imaging lens 1 according to an embodiment of the invention. In FIGS. 1 and 12, the left side is an object side, and the right side is an image side. FIGS. 1 and 12 also show the focusing of an on-axis beam 2 from an infinite object point and off-axis beams 3 and 4 at a maximum angle of view. In this case, the on-axis beam is a beam from an object point on an optical axis Z, and the off-axis beam is a beam from the object point out of the optical axis Z.

FIGS. 1 and 12 also show an imaging device 5 that is arranged on an image surface including the imaging position Pim of the imaging lens 1, considering when the imaging lens 1 is applied to an imaging apparatus. The imaging device 5 converts an optical image formed by the imaging lens 1 into electric signals, and is composed of, for example, a CCD image sensor.

FIG. 1 shows an optical member PP, which is a plane parallel plate provided between a lens system and the imaging device 5 (imaging surface), and light shielding units 11 and 12 respectively provided on the image-side surfaces of the first and second lenses L1 and L2. The optical member PP and the light shielding units 11 and 12 are not necessarily required, will be described below.

First Embodiment

The imaging lens 1 according to a first embodiment shown in FIG. 1 includes a first lens L1 that has a negative power and includes a concave surface facing an image side, a second lens L2 having a positive power, a third lens L3 having a positive power, an aperture diaphragm St, a fourth lens L4, which is a biconcave lens having a negative power, a fifth lens L5 that has a positive power and includes a convex surface facing the image side, and a sixth lens L6 that has a positive power and includes a convex surface facing an object side. The first to sixth lenses are arranged in this order from the object side.

The imaging lens 1 includes a relatively small number of lenses, for example, a minimum of six lenses. Therefore, it is possible to reduce the total length of the imaging lens in the optical axis direction. FIG. 1 does not show the shape or size of the aperture diaphragm St, but shows the position of the aperture diaphragm St on the optical axis Z.

Since the first lens L1 has a negative power and includes a concave surface facing the image side, it is possible to increase the angle of view of the entire lens system. In addition, since the first lens L1 has a negative power and includes a concave surface facing the image side, it is possible to reflect the off-axis beam in the optical axis direction and reduce the size of a lens system in the diametric direction. As shown in FIG. 1, when the first lens L1 is a biconcave lens, it is possible to increase the negative power of the first lens L1, and it is easy to further reduce the size of the lens system in the diametric direction.

In the first lens L1, it is preferable that the absolute value of the curvature radius of an object-side surface be greater than that of the curvature radius of an image-side surface. In this case, it is possible to effectively correct field curvature.

The Abbe number of the material forming the first lens L1 with respect to the d-line is preferably equal to or greater than 40, and more preferably equal to or greater than 47. In this case, it is possible to prevent the generation of longitudinal chromatic aberration and lateral chromatic aberration.

The second lens L2 and the third lens L3 are positive lenses. As such, when the positive power is dispersed by two lenses provided on the object side of the aperture diaphragm St, it is possible to effectively correct spherical aberration. For example even in an optical system having an F number of 2.0 or less, it is easy to achieve a high optical performance.

Since the image-side surface of the second lens L2 is a convex surface, it is possible to effectively correct field curvature.

In the second lens L2, it is preferable that the absolute value of the curvature radius of an object-side surface be greater than that of the curvature radius of an image-side surface. In this case, it is possible to effectively correct field curvature and spherical aberration.

The Abbe number of the material forming the second lens L2 with respect to the d-line is preferably equal to or greater than 25, and more preferably equal to or greater than 30. In this case, it is possible to prevent the generation of longitudinal chromatic aberration and lateral chromatic aberration.

Since the object-side surface of the third lens L3 is a convex surface, it is possible to effectively correct field curvature.

In the third lens L3, the absolute value of the curvature radius of an object-side surface is less than that of the curvature radius of an image-side surface. In this way, it is possible to effectively correct spherical aberration and field curvature.

The Abbe number of the material forming the third lens L3 with respect to the d-line is preferably equal to or greater than 40, and more preferably equal to or greater than 45. In this case, it is possible to prevent the generation of longitudinal chromatic aberration and lateral chromatic aberration.

Since the fourth lens L4 is a biconcave lens, the fourth lens L4 can have a strong negative power.

The Abbe number of the material forming the fourth lens L4 with respect to the d-line is preferably equal to or less than 30, and more preferably equal to or less than 20. Therefore, it is possible to effectively correct longitudinal chromatic aberration and lateral chromatic aberration.

The fifth lens L5 and the sixth lens L6 are positive lenses. As such, when the positive power is dispersed by two lenses provided on the image side of the aperture diaphragm St, it is possible to effectively correct spherical aberration. For example, even in an optical system having an F number of 2.0 or less, it is easy to achieve a high optical performance.

Since the image-side surface of the fifth lens L5 is a convex surface, it is possible to effectively correct field curvature.

In the fifth lens L5, the absolute value of the curvature radius of an object-side surface is greater than that of the curvature radius of an image-side surface. In this way, it is possible to effectively correct spherical aberration and field curvature.

The Abbe number of the material forming the fifth lens L5 with respect to the d-line is preferably equal to or greater than 40, and more preferably equal to or greater than 45. In this case, it is possible to prevent the generation of longitudinal chromatic aberration and lateral chromatic aberration.

Since the object-side surface of the sixth lens L6 is a convex surface, it is possible to effectively correct field curvature.

In the sixth lens L6, the absolute value of the curvature radius of an object-side surface is less than that of the curvature radius of an image-side surface. In this way, it is possible to effectively correct spherical aberration and field curvature.

The Abbe number of the material forming the sixth lens L6 with respect to the d-line is preferably equal to or greater than 40, and more preferably equal to or greater than 45. In this case, it is possible to prevent the generation of longitudinal chromatic aberration and lateral chromatic aberration.

It is preferable that the imaging lens according to the first embodiment of the invention satisfy the following Conditional expressions 1 to 9. In addition, the imaging lens may satisfy any one of the following Conditional expressions 1 to 9 or any combinations thereof:

| | |
|---|---|
| $1.00 < f456/f < 1.88$, | [Conditional expression 1] |
| $0.30 < |R8/R9| < 0.90$, | [Conditional expression 2] |
| $0.15 < Bf/(L-Bf) < 0.25$, | [Conditional expression 3] |
| $1.20 < f5/f < 1.50$, | [Conditional expression 4] |
| $0.3 < D6/D7 < 1.2$, | [Conditional expression 5] |
| $0.3 < |f1/f2| < 1.0$, | [Conditional expression 6] |
| $2.0 < ED1/IH < 4.0$, | [Conditional expression 7] |
| $2.0 < L/f < 7.0$, and | [Conditional expression 8] |
| $0.3 < Bf/f < 1.2$ | [Conditional expression 9] |

(where f indicates the focal length of the entire lens system, f1 indicates the focal length of the first lens L1, f2 indicates the focal length of the second lens L2, f5 indicates the focal length of the fifth lens L5, f456 indicates a composite focal length from the fourth lens L4 to the sixth lens L6, R8 indicates the curvature radius of an object-side surface of the fourth lens L4, R9 indicates the curvature radius of an image-side surface of the fourth lens L4, D6 indicates an air space between the third lens L3 and the aperture diaphragm St on the optical axis, D7 indicates an air space between the aperture diaphragm St and the fourth lens L4 on the optical axis, L indicates the distance from an object-side surface of the first lens L1 to the image surface on the optical axis (a back focal length is an air equivalent length), Bf indicates the distance from an image-side surface of the sixth lens L6 to the image surface on the optical axis (corresponding to the back focal length, which is an air equivalent length), ED1 indicates the effective diameter of the object-side surface of the first lens L1, and IH indicates a maximum image height).

For example, ED1 and IH may be determined by the specifications of an imaging lens or the specifications of an imaging apparatus.

If the ratio is greater than the upper limit of Conditional expression 1, the composite power of three lenses on the image side of the aperture diaphragm St is decreased, and it is difficult to effectively correct distortion and increase an angle of view. If the ratio is less than the lower limit of Conditional expression 1, the composite power of three lenses on the image side of the aperture diaphragm St is increased, and it is difficult to correct field curvature. In addition, the back focal length is reduced. As a result, it is difficult to provide various filters or a cover glass between the lens system and the imaging device arranged on the image surface.

If the absolute value is greater than the upper limit of Conditional expression 2, it is difficult to effectively correct field curvature. If the absolute value is less than the lower limit of Conditional expression 2, the absolute value of the curvature radius of the object-side surface of the fourth lens L4 is excessively small. As a result, it is difficult to process the lens.

If the ratio is greater than the upper limit of Conditional expression 3, the overall size of the entire lens system increases. If the ratio is less than the lower limit of Conditional expression 3, the back focal length is reduced. As a result, it is difficult to provide various filters or a cover glass between the lens system and the imaging device arranged on the image surface.

If the ratio is greater than the upper limit of Conditional expression 4, it is difficult to effectively correct field curvature. If the ratio is less than the lower limit of Conditional expression 4, the power of the fifth lens L5 is excessively high, and the tolerance of manufacturing error and assembly error is reduced due to eccentricity. As a result, it is difficult to assemble an imaging lens, and manufacturing costs increase.

If the ratio is greater than the upper limit of Conditional expression 5, the aperture diaphragm St leans to the fourth lens L4, and the diameter of a lens arranged on the object side of the aperture diaphragm St increases. If the ratio is less than the lower limit of Conditional expression 5, the aperture diaphragm St is too close to the third lens L3. As a result, the diameter of a lens arranged on the image side of the aperture diaphragm St is increased.

If the absolute value is greater than the upper limit of Conditional expression 6, the power of the first lens L1 is decreased. Therefore, it is difficult to increase the angle of view or the back focal length. If the absolute value is less than the lower limit of Conditional expression 6, it is difficult to effectively correct field curvature and distortion.

If the ratio is greater than the upper limit of Conditional expression 7, the effective diameter (ED: Effective Diameter) of the first lens L1 is excessively large, and it is difficult to reduce the size of a portion of the lens exposed to the outside. For example, when the imaging lens is provided in an in-vehicle camera, it is preferable that a small portion of the lens be exposed to the outside in order to prevent the outward appearance of the vehicle from being damaged. Therefore, it is preferable that the imaging lens be configured to satisfy the upper limit of Conditional expression 7. If the ratio is less than the lower limit of Conditional expression 7, it is possible to reduce the size of the portion of the lens exposed to the outside, but it is difficult for an optical system arranged on the object side of the aperture diaphragm St to separate an on-axis beam and an off-axis beam. As a result, it is difficult to effectively correct field curvature.

If the ratio is greater than the upper limit of Conditional expression 8, the total length of a lens system in the optical axis direction increases. As a result, the size of the lens system increases, and it is difficult to increase the angle of view. If the ratio is less than the lower limit of Conditional expression 8, the total length of the lens system is excessively small, and the thickness of each lens is reduced. As a result, it is difficult to process and assemble the lens system.

If the ratio is greater than the upper limit of Conditional expression 9, the back focal length is excessively large. As a result, the size of the entire lens system increases. If the ratio is less than the lower limit of Conditional expression 9, the back focal length is too small to provide various filters or a cover glass between the lens system and the imaging device arranged on the image surface. In addition, a ghost is likely to occur due to light returning from the imaging device to the lens system.

It is more preferable that the imaging lens according to the first embodiment satisfy Conditional expressions 1-1, 2-1, 6-1, 7-1, 8-1, and 9-1 given below:

| | |
|---|---|
| $1.1 < f456/f < 1.88$, | [Conditional expression 1-1] |
| $0.4 < \|R8/R9\| < 0.90$, | [Conditional expression 2-1] |
| $0.4 < \|f1/f2\| < 0.8$, | [Conditional expression 6-1] |
| $3.0 < ED1/IH < 4.0$, | [Conditional expression 7-1] |
| $2.0 < L/f < 4.0$, and | [Conditional expression 8-1] |
| $0.5 < Bf/f < 1.0$ | [Conditional expression 9-1] |

When Conditional expression 1-1 is satisfied, it is easy to correct field curvature and ensure a sufficient back focal length to provide various filters or a cover glass.

When Conditional expression 2-1 is satisfied, it is effective to process a lens.

When the upper limit of Conditional expression 6-1 is satisfied, it is easy to increase the angle of view or obtain a long back focal length. When the lower limit of Conditional expression 6-1 is satisfied, it is possible to more effectively correct field curvature and distortion.

When Conditional expression 7-1 is satisfied, it is possible to more effectively correct field curvature.

When Conditional expression 8-1 is satisfied, it is possible to further reduce the size of a lens system.

When Conditional expression 9-1 is satisfied, it is possible to further improve the effects obtained when Conditional expression 9 is satisfied.

Second Embodiment

An imaging lens 1 according to a second embodiment shown in FIG. 12 includes a first lens L1 that has a negative power and includes a concave surface facing an image side, a second lens L2, which is a biconvex lens having a positive power, a third lens L3 having a positive power, an aperture diaphragm St, a fourth lens L4, which is a biconcave lens having a negative power, a fifth lens L5 that has a positive power and includes a convex surface facing the image side, and a sixth lens L6 that has a positive power and includes a convex surface facing an object side. The first to sixth lenses are arranged in this order from the object side. The imaging lens 1 includes a relatively small number of lenses, for example, a minimum of six lenses. Therefore, it is possible to reduce the total length of the imaging lens in the optical axis direction. FIG. 12 does not show the shape or size of the aperture diaphragm St, but shows the position of the aperture diaphragm St on the optical axis Z.

Since the first lens L1 has a negative power and includes a concave surface facing the image side, it is possible to increase the angle of view of the entire lens system. In addition, since the first lens L1 has a negative power and includes a concave surface facing the image side, it is possible to reflect the off-axis beam in the optical axis direction anti reduce the size of the lens system in the diametric direction. As shown in FIG. 12, when the first lens L1 is a biconcave lens, it is possible to increase the negative power of the first lens L1, and it is easy to further reduce the size of the lens system in the diametric direction.

In the first lens L1, it is preferable that the absolute value of the curvature radius of an object-side surface be greater than that of the curvature radius of an image-side surface. In this case, it is possible to effectively correct field curvature.

The Abbe number of the material forming the first lens L1 with respect to the d-line is preferably equal to or greater than 40, and more preferably equal to or greater than 47. In this case, it is possible to effectively correct lateral chromatic aberration.

The second lens L2 and the third lens L3 are positive lenses. As such, when the positive power is dispersed by two lenses provided on the object side of the aperture diaphragm St, it is possible to effectively correct spherical aberration. For example, even in an optical system having an F number of 2.0 or less, it is easy to achieve a high optical performance.

Since the second lens L2 is a biconvex lens and the image-side surface of the second lens L2 is a convex surface, it is possible to effectively correct field curvature.

In the second lens L2, when the absolute value of the curvature radius of an object-side surface is equal to or greater than that of the curvature radius of an image-side surface, it is possible to effectively correct spherical aberration.

When the Abbe number of the material forming the second lens L2 with respect to the d-line is equal to or greater than 45, it is possible to effectively correct longitudinal chromatic aberration.

When the refractive index of the material forming the second lens L2 with respect to the d-line is N2, it is preferable that N2 be in the range of 1.65 to 1.9. In this case, it is possible to obtain the second lens L2 having an appropriate power while ensuring the thickness of the edge of the second lens. If N2 is equal to or less than 1.65, the curvature of the surface of the second lens L2 is reduced in order to sufficiently increase the power of the second lens L2, and the thickness of the edge of the second lens L2 is reduced. As a result, it is difficult to process the lens. When the thickness of the second lens L2 is increased in order to solve the above-mentioned problem, the size of the lens system is increased. If N2 is equal to or greater than 1.9, an expensive material is used to form the lens, resulting in an increase in costs.

Since the object-side surface of the third lens L3 is a convex surface, it is possible to effectively correct field curvature.

In the third lens L3, when the absolute value of the curvature radius of the object-side surface is equal to or smaller than that of the curvature radius of the image-side surface, it is possible to effectively correct spherical aberration.

The Abbe number of the material forming the third lens L3 with respect to the d-line is preferably equal to or greater than 40. In this case, it is possible to effectively correct longitudinal chromatic aberration.

Since the fourth lens L4 is a biconcave lens, the fourth lens L4 can have a strong negative power.

The Abbe number of the material forming the fourth lens L4 with respect to the d-line is preferably equal to or less than 30, and more preferably equal to or less than 20. In this case, it is possible to effectively correct longitudinal chromatic aberration and lateral chromatic aberration.

The fifth lens L5 and the sixth lens L6 are positive lenses. As such, when the positive power is dispersed by two lenses provided on the image side of the aperture diaphragm St, it is possible to effectively correct spherical aberration. For example, even in an optical system having an F number of 2.0 or less, it is easy to achieve a high optical performance.

Since the image-side surface of the fifth lens L5 is a convex surface, it is possible to effectively correct field curvature.

In the fifth lens L5, when the absolute value of the curvature radius of the object-side surface is equal to or greater than that of the curvature radius of the image-side surface, it is possible to effectively correct field curvature.

The Abbe number of the material forming the fifth lens L5 with respect to the d-line is preferably equal to or greater than 40. In this case, it is possible to effectively correct longitudinal chromatic aberration and lateral chromatic aberration.

Since the object-side surface of the sixth lens L6 is a convex surface, it is possible to effectively correct field curvature.

In the sixth lens L6, when the absolute value of the curvature radius of the object-side surface is equal to or less than that of the curvature radius of the image-side surface, it is possible to effectively correct field curvature.

The Abbe number of the material forming the sixth lens L6 with respect to the d-line is preferably equal to or greater than 40, and more preferably equal to or greater than 45. In this case, it is possible to effectively correct longitudinal chromatic aberration and lateral chromatic aberration.

When the refractive index of the material forming the sixth lens L6 with respect to the d-line is N6, it is preferable that the refractive index N6 of the material forming the sixth lens L6 be equal to or less than 1.75. When the refractive index N6 of the material is equal to or less than 1.75, it is possible to prevent an increase in the cost of the material forming the sixth lens L6 and select a material having a large Abbe number. As a result, it is effective to correct chromatic aberration.

It is preferable that the imaging lens according to the second embodiment of the invention satisfy the following Conditional expressions 11 to 23. In addition, the imaging lens may satisfy any one of the following Conditional expressions 11 to 23 or any combinations thereof:

| | |
|---|---|
| $0.30 < f5/f6 < 0.95$, | [Conditional expression 11] |
| $0.50 < f2/f3 < 1.80$, | [Conditional expression 12] |
| $0.5 < R3/f < 4.0$, | [Conditional expression 13] |
| $2.0 < L/f < 7.0$, | [Conditional expression 14] |
| $0.8 < f5/f < 1.6$, | [Conditional expression 15] |
| $0.3 < |f1/f2| < 1.0$, | [Conditional expression 16] |
| $1.50 < f456/f < 2.50$, | [Conditional expression 17] |
| $0.50 < Bf/f < 1.20$, | [Conditional expression 18] |
| $1.0 < f2 < f < 2.0$, | [Conditional expression 19] |
| $0.03 < |R8/R9| < 1.0$, | [Conditional expression 20] |
| $2.0 < |R4/f| < 4.2$, | [Conditional expression 21] |
| $0.15 < Bf/(L-Bf) < 0.25$, and | [Conditional expression 22] |
| $2.0 < ED1/IH < 4.0$ | [Conditional expression 23] |

(where f indicates the focal length of the entire lens system, f1 indicates the focal length of the first lens, f2 indicates the focal length of the second lens, f3 indicates the focal length of the third lens, f5 indicates the focal length of the fifth lens, f6 indicates the focal length of the sixth lens, f456 indicates a composite focal length from the fourth lens to the sixth lens, R3 indicates the curvature radius of an object-side surface of the second lens, R4 indicates the curvature radius of an image-side surface of the second lens, R8 indicates the curvature radius of an object-side surface of the fourth lens L4, R9 indicates the curvature radius of an image-side surface of the fourth lens L4, L indicates the distance from an object-side surface of the first lens L1 to the image surface on the optical axis back focal length is an air equivalent length), Bf indicates the distance from an image-side surface of the sixth lens L6 to the image surface on the optical axis (corresponding to the back focal length, which is an air equivalent length), ED1 indicates the effective diameter of the object-side surface of the first lens L1, and IH indicates a maximum image height).

For example, ED1 and IH may be determined by the specifications of the imaging lens or the specifications of the imaging apparatus.

Conditional expression 11 relates to the power ratio of the fifth lens L5 to the sixth lens L6. The fifth lens L5 and the sixth lens L6 are positive lenses. As shown in FIG. 12, the height of the beam in the sixth lens is larger than that of the beam in the fifth lens L5. If the ratio is greater than the upper limit of Conditional expression 11, the power of the sixth lens L6 is excessively high, and the curvature of the sixth lens is reduced. Therefore, the thickness of the edge of the lens is reduced. As a result, it is difficult to process the lens. If the ratio is less than the lower limit of Conditional expression 11, the power of the fifth lens L5 is excessively high. As a result, it is difficult to effectively correct field curvature.

When Conditional expression 12 is satisfied, it is possible to uniformly distribute the positive power to the second lens L2 and the third lens and thus effectively correct spherical aberration. That is, if the ratio is beyond the upper limit or the lower limit of Conditional expression 12, the positive power is concentrated on the second lens L2 or the third lens L3. As a result, it is difficult to correct spherical aberration.

If the ratio is greater than the upper limit of Conditional expression 13, it is difficult to correct field curvature. If the ratio is less than the lower limit of Conditional expression 13, the curvature radius of the object-side surface of the second lens L2 is reduced, and the thickness of the edge of the second lens is excessively small. As a result, it is difficult to process the lens.

If the ratio is greater than the upper limit of Conditional expression 14, the total length of the lens system on the optical axis increases. Therefore, the size of the lens system increases, and it is difficult to increase the angle of view. If the ratio is less than the lower limit of Conditional expression 14, the total length of the lens system is excessively small and the thickness of each lens is reduced. Therefore, it is difficult to process and assemble the lens system.

If the ratio is greater than the upper limit of Conditional expression 15, it is difficult to effectively correct field curvature. If the ratio is less than the lower limit of Conditional expression 15, the power of the fifth lens L5 is excessively high, and the tolerance of manufacturing error and assembly error is reduced due to eccentricity. As a result, it is difficult to assemble the lens system, and manufacturing costs increase.

If the absolute value is greater than the upper limit of Conditional expression 16, the power of the first lens L1 is reduced, and it is difficult to obtain a wide angle of view and increase the back focal length. If the ratio is less than the lower limit of Conditional expression 16, it is difficult to effectively correct field curvature and distortion.

If the ratio is greater than the upper limit of Conditional expression 17, it is difficult to effectively correct distortion and increase the angle of view. If the ratio is less than the lower limit of Conditional expression 17, it is difficult to correct field curvature, and the back focal length is reduced. As a result, it is difficult to provide various filters or a cover glass between the lens system and the imaging device arranged on the image surface.

If the ratio is greater than the upper limit of Conditional expression 18, the back focal length is excessively large. As a result, the size of the lens system increases. If the ratio is less than the lower limit of Conditional expression 18, it is difficult to provide various filters or a cover glass between the lens system and the imaging device arranged on the image surface. In addition, a ghost is likely to occur due to return light from the imaging device to the lens system.

If the ratio is greater than the upper limit of Conditional expression 19, the power of the second lens L2 is excessively high, and the tolerance of manufacturing error and assembly error is reduced due to eccentricity. As a result, it is difficult to assemble the lens system, and manufacturing costs increase. If the ratio is less than the lower limit of Conditional expression 19, it is difficult to effectively correct comatic aberration.

If the absolute value is greater than the upper limit of Conditional expression 20, it is difficult to effectively correct field curvature. If the absolute value is less than the lower limit of Conditional expression 20, the absolute value of the curvature radius of the object-side surface of the fourth lens L4 is excessively small. As a result, it is difficult to process the lens.

If the absolute value is greater than the upper limit of Conditional expression 21, it is difficult to correct field curvature. If the absolute value is less than the lower limit of Conditional expression 21, the absolute value of the curvature radius of the image-side surface of the second lens L2 is excessively small, and the thickness of the edge of the second lens L2 is excessively small. As a result, it is difficult to process the lens.

If the ratio is greater than the upper limit of Conditional expression 22, the size of the entire lens system increases. If the ratio is less than the lower limit of Conditional expression 22, the back focal length is reduced. Therefore, it is difficult to provide various filters or a cover glass between the lens system and the imaging device arranged on the image surface.

If the ratio is greater than the upper limit of Conditional expression 23, the effective diameter of the first lens L1 is excessively large, and it is difficult to reduce the size of a portion of the lens exposed to the outside. For example, when the imaging lens is provided in an in-vehicle camera, it is preferable that a small portion of the lens be exposed to the outside in order to prevent the outward appearance of the vehicle from being damaged. Therefore, it is preferable that the imaging lens be configured to satisfy the upper limit of Conditional expression 23. If the ratio is less than the lower limit of Conditional expression 23, it is possible to reduce the size of a portion of the lens exposed to the outside, but it is difficult for an optical system arranged on the object side of the aperture diaphragm to separate an on-axis beam and an off-axis beam. As a result, it is difficult to effectively correct field curvature.

The term 'effective diameter of a lens surface' means the diameter of a circle drawn by the intersection point between the lens surface and a beam passing through the outermost portion of the lens (a portion furthest away from the optical axis) among effective beams passing through the lens surface when the optical system is rotationally symmetric. In addition, the effective beam passing through the lens surface means a beam used to form the image of an object.

It is more preferable that the imaging lens according to this embodiment satisfy Conditional expressions 11-1, 12-1, 14-1, 14-2, 15-1, 16-1, 18-1, 19-1, and 20-1 given below:

$0.40 < f5/f6 < 0.8,$ [Conditional expression 11-1]

$0.8 < f2/f3 < 1.6,$ [Conditional expression 12-1]

$2.0 < L/f < 4.2,$ [Conditional expression 14-1]

$2.5 < L/f < 3.8,$ [Conditional expression 14-2]

$1.0 < f5/f < 1.6,$ [Conditional expression 15-1]

$0.4 < |f1/f2| < 0.8,$ [Conditional expression 16-1]

$0.7 < Bf/f < 1.0,$ [Conditional expression 18-1]

$1.2 < f2 < f < 1.9,$ and [Conditional expression 19-1]

$0.3 < |R8/R9| < 0.9.$ [Conditional expression 20-1]

When Conditional expression 11-1 is satisfied, it is possible to effectively process the lens and effectively correct field curvature.

When Conditional expression 12-1 is satisfied, it is easy to effectively correct spherical aberration.

When Conditional expression 14-1 is satisfied, it is possible to reduce the size of a lens system.

When Conditional expression 14-2 is satisfied, it is possible to further reduce the size of a lens system.

It is preferable that L be equal to or less than 24 mm in order to reduce the size of the entire lens system. It is more preferable that L be equal to or less than 23 mm in order to further reduce the size of the entire lens system.

When Conditional expression 15-1 is satisfied, it is possible to effectively manufacture the lens and reduce manufacturing costs.

When the upper limit of Conditional expression 16-1 is satisfied, it is easy to increase the angle of view or the back focal length. When the lower limit of Conditional expression 16-1 is satisfied, it is possible to more effectively correct field curvature and distortion.

When Conditional expression 18-1 is satisfied, it is possible to further reduce the size of a lens system.

When the upper limit of Conditional expression 19-1 is satisfied, it is possible to effectively manufacture the lens and reduce manufacturing costs. When the lower limit of Conditional expression 19-1 is satisfied, it is easy to effectively correct comatic aberration.

When the upper limit of Conditional expression 20-1 is satisfied, it is easy to effectively correct field curvature. When the lower limit of Conditional expression 20-1 is satisfied, it is possible to further improve the workability of the fourth lens L4.

In the first and second embodiments, for example, when the imaging lens 1 is used in a severe environment, such as in an in-vehicle camera, it is preferable that the first lens L1 arranged closest to the object side be made of a material capable of preventing the deterioration of the surface of the lens due to rain and wind and temperature variation due to direct exposure to sunlight, and having high resistance to chemicals, such as oils, fats, and detergent, that is, a material having high water resistance, high weather resistance, high acid resistance, and high chemical resistance. In addition, it is preferable that the first lens L1 arranged closest to the object side be made of a hard and splinterless material. Specifically, it is preferable that the first lens L1 be made of glass or transparent ceramics. The strength and heat resistance of the ceramics are higher than those of general glass.

It is preferable that the thickness of the center of the first lens L1 be equal to or greater than 0.5 mm. When the imaging lens is applied to, for example, an in-vehicle camera, the lens system needs to have sufficient resistance to various impacts. If the thickness of the center of the first lens L1 is equal to or greater than 0.5 mm, the first lens L1 is less likely to be cracked.

When the imaging lens 1 is applied to, for example, an in-vehicle camera, the imaging lens 1 needs to be used in a wide temperature range in the vehicle from a low temperature in a cold region to a high temperature in a tropical region. When the imaging lens 1 is used in the wide temperature range, the lens is preferably made of a material having a small linear expansion coefficient. When the imaging lens is required to be used in a wide temperature range as in the in-vehicle camera, all the lenses are preferably made of glass.

In addition, it is preferable that the first lens L1 have a waterproof structure in order to cut the flow of air to the outside such that the inside of the imaging lens is not clouded due to rapid temperature and humidity variations. As the waterproof structure, any of the following structures may be used: a sealing structure in which the first lens L1 is closely adhered to a lens frame; and a sealing structure in which an air-tightening members such as O-ring is inserted between the first lens L1 and the lens frame.

When the lens system is used in severe temperature and humidity environments, it is preferable that a cemented lens not be used for the lens system. When the imaging lens 1 is applied to, for example, an in-vehicle camera, the imaging lens 1 needs to be used in a wide temperature range in the vehicle from a low temperature in a cold region to a high temperature in a tropical region. When a cemented lens is used, a special adhesive needs to be used in order to use the imaging lens in a wide temperature range, which results in an increase in costs.

It is preferable that all the lenses be spherical lenses in order to manufacture the lenses at a low cost. Alternatively, all the lenses may be aspheric lenses in order to improve the performance, for example, to more effectively correct each aberration. The lens may be made of plastic in order to accurately form an aspheric surface with a low cost.

When the imaging lens 1 is applied to an imaging apparatus, it is preferable to provide, for example, a cover glass, a low pass filter, or an infrared cut filter according to the structure of a camera provided with the lens. The optical member PP is provided in consideration of the above. For example, when the imaging lens 1 is used for a night-vision camera that is provided in a vehicle to aid night vision, a filter that cuts blue light from ultraviolet light may be provided between the lens system and the imaging device.

Instead of providing a low pass filter or various filters for cutting a specific wavelength band between the lens system and the imaging device 5, various filters may be provided between the lenses. Alternatively, a filter having the same effect as various filters may be coated on the lens surface of any one of the lenses of the imaging lens 1.

There is a concern that a beam passing through a portion of each lens other than an effective diameter between the lenses will be incident as stray light on the image surface and serve as a ghost. Therefore, it is preferable to provide a light shielding unit that shields the stray light, if necessary. As the light shielding unit, for example, an opaque pigment may be coated on a portion of the image-side surface of the lens other than the effective diameter, or an opaque plate may be provided. Alternatively, an opaque plate may be provided on the optical path of a beam, serving as stray light, thereby forming a light shielding unit. Alternatively, for example, a hood that shields the stray light may be provided on the object side of the lens closest to the object side. For example, in FIGS. 1 and 12, the light shielding units 11 and 12 are provided on the image-side surfaces of the first and second lenses L1 and L2, respectively. However, the positions of the light shielding units are not limited to those shown in FIGS. 1 and 12. The light shielding units may be provided on the surfaces of other lenses or between the lenses.

In addition, a member that shields a marginal ray may be provided between the lenses. The marginal ray means a beam passing through a peripheral portion of the entrance pupil of the optical system, among the beams from an object point out of the optical axis Z. It is possible to improve image quality in the periphery of an imaging region by shielding the marginal ray in the range in which there is no practical problem in the ratio of the quantity of marginal light. In addition, it is possible to reduce the ghost by shielding light causing the ghost with the member.

EXAMPLES

Next, detailed numerical examples of the imaging lens according to the invention will be described.

Example 1

Figure 2:
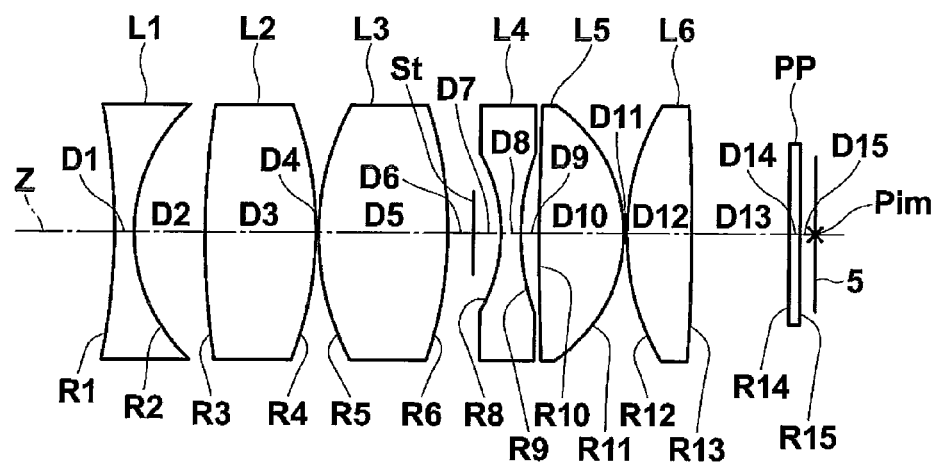
FIG. 2 is a cross-sectional view illustrating the structure of an imaging lens according to Example 1 of the invention.

The structure of an imaging lens according to Example 1 is shown in FIG. 2, and lens data and various data are shown in Table 1.

TABLE 1

Example 1 Lens data

| Si | Ri | Di | Ndj | vdj |
|---|---|---|---|---|
| 1 | −23.43 | 0.70 | 1.7725 | 49.6 |
| 2 | 6.15 | 2.50 | | |
| 3 | 30.05 | 3.90 | 1.8830 | 40.8 |
| 4 | −12.55 | 0.11 | | |
| 5 | 9.58 | 4.50 | 1.7550 | 52.3 |
| 6 | −14.19 | 0.89 | | |
| 7 (Aperture diaphragm) | | 0.97 | | |
| 8 | −5.66 | 0.70 | 1.9229 | 18.9 |
| 9 | 8.22 | 0.64 | | |
| 10 | 100.17 | 3.00 | 1.7550 | 52.3 |
| 11 | −5.39 | 0.10 | | |
| 12 | 8.86 | 2.30 | 1.7725 | 49.6 |
| 13 | −73.14 | 3.40 | | |
| 14 | ∞ | 0.40 | 1.5168 | 64.2 |
| 15 | ∞ | 0.50 | | |
| Image surface | — | | | |

Example 1 Various data

| | |
|---|---|
| Fno. | 2.00 |
| 2ω | 62.4 |
| L | 24.48 |
| Bf | 4.17 |
| f | 5.07 |
| f1 | −6.24 |
| f2 | 10.48 |
| f3 | 8.25 |
| f4 | −3.54 |
| f5 | 6.86 |
| f6 | 10.36 |

TABLE 1-continued

| | |
|---|---|
| f456 | 7.60 |
| IH | 2.8 |
| ED1 | 8.29 |

In the lens data shown in Table 1, Si indicates an i-th (i=1, 2, 3, . . . ) surface number. In this case, the surface of a component closest to the object side is given number 1, and the surface number is sequentially increased toward the image side. In addition, the lens data shown in Table 1 includes the aperture diaphragm St and the optical member PP.

In Table 1, Ri indicates the curvature radius of the i-th (i=1, 2, 3, . . . ) surface, and Di indicates the surface spacing between the i-th (i=1, 2, 3, . . . ) surface and an (i+1)-th surface on the optical axis Z. In addition, Ndj indicates the refractive index of a j-th (j=1, 2, 3, . . . ) optical component with respect to the d-line. In this case, an optical component arranged closest to the object side is given number 1, and the number is sequentially increased toward the image side. In addition, vdj indicates the Abbe number of the j-th optical component with respect to the d-line. In Table 1, when the lens surface is convex toward the object side, the curvature radius thereof has a positive value. When the lens surface is convex toward the image side, the curvature radius thereof has a negative value.

In various data shown in Table 1, Fno. indicates an F number, 2ω indicates a total angle of view, L indicates the distance from the object-side surface of the first lens L1 to the image surface on the optical axis Z (the back focal length, which is an air equivalent length), Bf indicates the distance from the image-side surface of the sixth lens L6 to the image surface (corresponding to the back focal which is an air equivalent length), f indicates the focal length of the entire lens system, f1 indicates the focal length of the first lens L1, f2 indicates the focal length of the second lens L2, f3 indicates the focal length of the third lens L3, f4 indicates the focal length of the fourth lens L4, f5 indicates the focal length of the fifth lens L5, f6 indicates the focal length of the sixth lens L6, f456 indicates a composite focal length from the fourth lens L4 to the sixth lens L6 (a composite focal length of the fourth lens L4, the fifth lens L5, and the sixth lens L6), IH indicates the maximum image height on the image surface, and ED1 indicates the effective diameter of the object-side surface of the first lens L1.

In the various data shown in Table 1, the unit of 2ω is degrees. In Table 1, the units of the curvature radius and the surface spacing are millimeters (mm). In addition, in Table 1, the units of L, Bf, each focal length, each composite focal length, IH and ED1 are millimeters (mm). However, the optical system has the same optical performance even when proportional magnification or proportional reduction is performed. Therefore, the unit is not limited to millimeters (mm), but other appropriate units may be used.

In FIG. 2, the left side is the object side, and the right side is the image side. FIG. 2 does not show the shape or size of the aperture diaphragm St, but shows the position thereof on the optical axis Z. In FIG. 2, Ri and Di (i=1, 2, 3, . . . ) correspond to Ri and Di in Table 1.

The meaning of symbols shown in Table 1 and a method of illustrating the lens structure are basically the same as those in the following examples.

The imaging lens according to Example 1 includes the first lens L1, which is a biconcave lens, the second lens L2, which is a biconvex lens, the third lens L3, which is a biconvex lens, the aperture diaphragm St, the fourth lens L4, which is a biconcave lens, the fifth lens L5, which is a biconvex lens, and the sixth lens L6, which is a biconvex lens, arranged in this order from the object side.

Example 2

Figure 3:
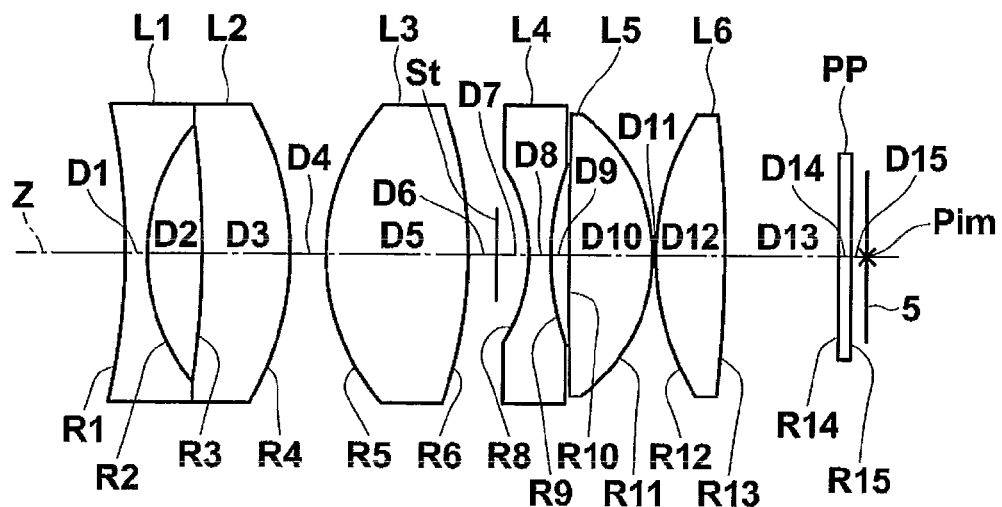
FIG. 3 is a cross-sectional view illustrating the structure of an imaging lens according to Example 2 of the invention.

The structure of an imaging lens according to Example 2 is shown in FIG. 3, and lens data and various other data are shown in Table 2. The imaging lens according to Example 2 includes a first lens L1, which is a biconcave lens, a second lens L2, which is a positive meniscus lens having a convex surface facing an image side, a third lens L3, which is a biconvex lens, an aperture diaphragm St, a fourth lens L4, which is a biconcave lens, a fifth lens L5, which is a biconvex lens, and a sixth lens L6, which is a biconvex lens, arranged in this order from an object side.

TABLE 2

Example 2 Lens data

| Si | Ri | Di | Ndj | vdj |
|---|---|---|---|---|
| 1 | −22.50 | 0.70 | 1.7725 | 49.6 |
| 2 | 6.47 | 1.75 | | |
| 3 | −30.17 | 2.80 | 1.8893 | 38 |
| 4 | −9.57 | 1.14 | | |
| 5 | 7.24 | 4.50 | 1.7550 | 52.3 |
| 6 | −14.54 | 0.90 | | |
| 7 (Aperture diaphragm) | | 1.04 | | |
| 8 | −5.27 | 0.70 | 1.9229 | 18.9 |
| 9 | 8.61 | 0.57 | | |
| 10 | 200.01 | 2.70 | 1.7550 | 52.3 |
| 11 | −5.53 | 0.10 | | |
| 12 | 8.40 | 2.20 | 1.8040 | 46.6 |
| 13 | −42.60 | 3.60 | | |
| 14 | ∞ | 0.40 | 1.5168 | 64.2 |
| 15 | ∞ | 0.50 | | |
| Image surface | — | | | |

Example 2 Various data

| | |
|---|---|
| Fno. | 2.00 |
| 2ω | 62.8 |
| L | 23.46 |
| Bf | 4.36 |
| f | 5.09 |
| f1 | −6.44 |
| f2 | 14.82 |
| f3 | 7.02 |
| f4 | −3.46 |
| f5 | 7.17 |
| f6 | 8.89 |
| f456 | 7.56 |
| IH | 2.8 |
| ED1 | 8.29 |

Example 3

Figure 4:
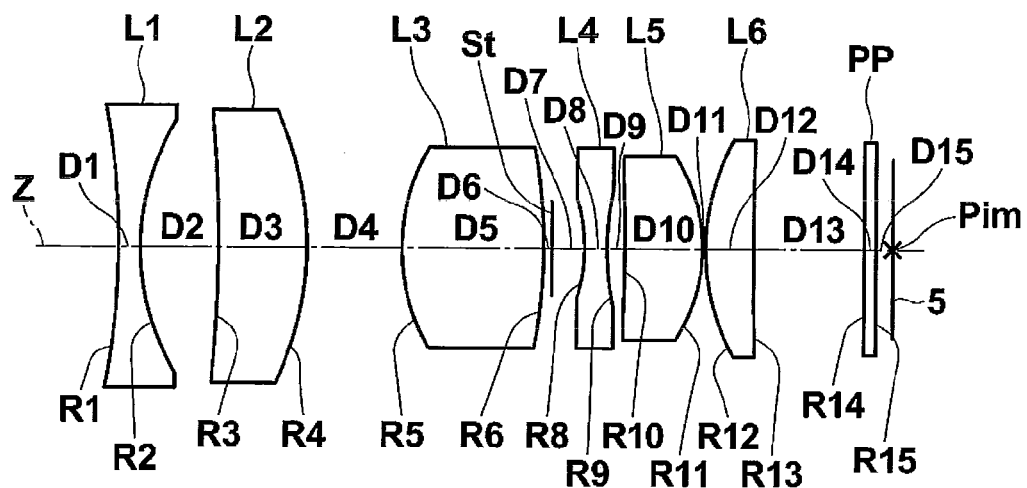
FIG. 4 is a cross-sectional view illustrating the structure of an imaging lens according to Example 3 of the invention.

The structure of an imaging lens according to Example 3 is shown in FIG. 4, and lens data and various other data are shown in Table 3. The imaging lens according to Example 3 includes a first lens L1, which is a biconcave lens, a second lens L2, which is a positive meniscus lens having a convex surface facing an image side, a third lens L3, which is a biconvex lens, an aperture diaphragm St, a fourth lens L4, which is a biconcave lens, a fifth lens L5, which is a positive meniscus lens having a convex surface facing the image side, and a sixth lens L6, which is a positive meniscus lens having a convex surface facing an object side, arranged in this order from the object side.

TABLE 3

Example 3 Lens data

| Si | Ri | Di | Ndj | vdj |
|---|---|---|---|---|
| 1 | −23.96 | 0.70 | 1.7725 | 49.6 |
| 2 | 7.88 | 2.50 | | |
| 3 | −43.22 | 2.80 | 1.8780 | 39.1 |
| 4 | −10.39 | 3.01 | | |
| 5 | 6.47 | 4.50 | 1.7550 | 52.3 |
| 6 | −17.58 | 0.25 | | |
| 7 (Aperture diaphragm) | | 1.06 | | |
| 8 | −5.17 | 0.70 | 1.9229 | 18.9 |
| 9 | 8.65 | 0.57 | | |
| 10 | −42.76 | 2.50 | 1.8348 | 42.7 |
| 11 | −5.41 | 0.10 | | |
| 12 | 7.16 | 1.53 | 1.7500 | 52.8 |
| 13 | 130.42 | 3.50 | | |
| 14 | ∞ | 0.40 | 1.5168 | 64.2 |
| 15 | ∞ | 0.50 | | |
| Image surface | — | | | |

Example 3 Various data

| | |
|---|---|
| Fno. | 2.00 |
| 2ω | 62.6 |
| L | 24.49 |
| Bf | 4.26 |
| f | 5.07 |
| f1 | −7.60 |
| f2 | 14.98 |
| f3 | 6.81 |
| f4 | −3.42 |
| f5 | 7.21 |
| f6 | 10.05 |
| f456 | 9.45 |
| IH | 2.8 |
| ED1 | 9.05 |

Example 4

Figure 5:
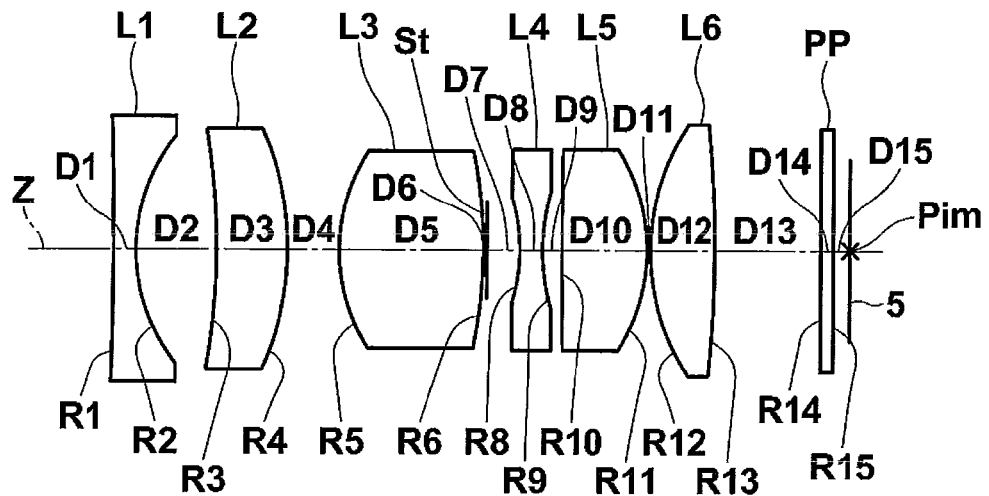
FIG. 5 is a cross-sectional view illustrating the structure of an imaging lens according to Example 4 of the invention.

The structure of an imaging lens according to Example 4 is shown in FIG. 5, and lens data and various other data are shown in Table 4. The imaging lens according to Example 4 includes a first lens L1, which is a biconcave lens, a second lens L2, which is a positive meniscus lens having a convex surface facing an image side, a third lens L3, which is a biconvex lens, an aperture diaphragm St, a fourth lens L4, which is a biconcave lens, a fifth lens L5, which is a biconvex lens, and a sixth lens L6, which is a biconvex lens, arranged in this order from an object side.

TABLE 4

Example 4 Lens data

| Si | Ri | Di | Ndj | vdj |
|---|---|---|---|---|
| 1 | −134.90 | 0.70 | 1.7725 | 49.6 |
| 2 | 5.76 | 2.50 | | |
| 3 | −21.86 | 2.21 | 1.8679 | 40.2 |
| 4 | −9.33 | 1.59 | | |
| 5 | 5.75 | 4.50 | 1.8348 | 42.7 |
| 6 | −15.17 | 0.10 | | |
| 7 (Aperture diaphragm) | | 1.03 | | |
| 8 | −5.34 | 0.70 | 1.9229 | 18.9 |
| 9 | 6.59 | 0.60 | | |
| 10 | 171.34 | 2.70 | 1.8348 | 42.7 |
| 11 | −5.91 | 0.10 | | |
| 12 | 7.12 | 2.00 | 1.7550 | 52.3 |
| 13 | −39.28 | 3.30 | | |

TABLE 4-continued

| | | | | |
|---|---|---|---|---|
| 14 | ∞ | 0.40 | 1.5168 | 64.2 |
| 15 | ∞ | 0.50 | | |
| Image surface | — | | | |

Example 4 Various data

| | |
|---|---|
| Fno. | 2.00 |
| 2ω | 62.6 |
| L | 22.80 |
| Bf | 4.06 |
| f | 5.06 |
| f1 | −7.30 |
| f2 | 17.04 |
| f3 | 6.08 |
| f4 | −3.11 |
| f5 | 7.44 |
| f6 | 8.61 |
| f456 | 8.61 |
| IH | 2.8 |
| ED1 | 9.38 |

Example 5

Figure 6:
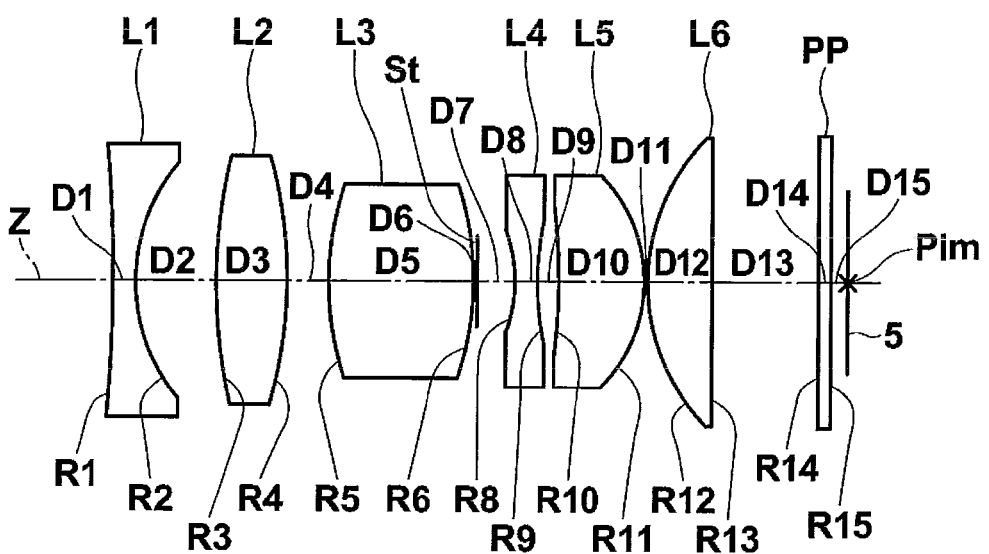
FIG. 6 is a cross-sectional view illustrating the structure of an imaging lens according to Example 5 of the invention.

The structure of an imaging lens according to Example 5 is shown in FIG. 6, and lens data and various other data are shown in Table 5. The imaging lens according to Example 5 includes a first lens L1, which is a biconcave lens, a second lens L2, which is a biconvex lens, a third lens L3, which is a biconvex lens, an aperture diaphragm St, a fourth lens L4, which is a biconcave lens, a fifth lens L5, which is a positive meniscus lens having a convex surface facing an image side, and a sixth lens L6, which is a biconvex lens, arranged in this order from an object side.

TABLE 5

Example 5 Lens data

| Si | Ri | Di | Ndj | νdj |
|---|---|---|---|---|
| 1 | −49.23 | 0.70 | 1.7725 | 49.6 |
| 2 | 5.78 | 2.50 | | |
| 3 | 17.06 | 2.20 | 1.8679 | 40.2 |
| 4 | −14.38 | 1.28 | | |
| 5 | 9.71 | 4.50 | 1.8348 | 42.7 |
| 6 | −9.62 | 0.10 | | |
| 7 (Aperture diaphragm) | | 1.17 | | |
| 8 | −4.67 | 0.70 | 1.9229 | 18.9 |
| 9 | 9.02 | 0.67 | | |
| 10 | −19.11 | 2.70 | 1.8348 | 42.7 |
| 11 | −4.70 | 0.10 | | |
| 12 | 6.52 | 2.00 | 1.7550 | 52.3 |
| 13 | −1662.50 | 3.30 | | |

TABLE 5-continued

| | | | | |
|---|---|---|---|---|
| 14 | ∞ | 0.40 | 1.5168 | 64.2 |
| 15 | ∞ | 0.50 | | |
| Image surface | — | | | |

Example 5 Various data

| | |
|---|---|
| Fno. | 2.00 |
| 2ω | 63.2 |
| L | 22.68 |
| Bf | 4.06 |
| f | 5.07 |
| f1 | −6.82 |
| f2 | 9.14 |
| f3 | 7.51 |
| f4 | −3.26 |
| f5 | 7.46 |
| f6 | 8.60 |
| f456 | 6.52 |
| IH | 2.8 |
| ED1 | 8.54 |

Table 6 shows values corresponding to Conditional expressions 1 to 9 in the imaging lenses according to Examples 1 to 5. In Examples 1 to 5, the d-line is used as a reference wavelength, and Table 6 shows each value at the reference wavelength. As can be seen from Table 6, Examples 1 to 5 satisfy all of Conditional expressions 1 to 9.

TABLE 6

| | Conditional expression | | | | | | | | |
|---|---|---|---|---|---|---|---|---|---|
| | (1) f456/f | (2) \|R8/R9\| | (3) Bf/(L − Bf) | (4) f5/f | (5) D6/D7 | (6) \|f1/f2\| | (7) ED1/IH | (8) L/f | (9) Bf/f |
| Example 1 | 1.50 | 0.69 | 0.21 | 1.35 | 0.91 | 0.60 | 2.96 | 4.83 | 0.82 |
| Example 2 | 1.49 | 0.61 | 0.23 | 1.41 | 0.86 | 0.43 | 2.96 | 4.61 | 0.86 |
| Example 3 | 1.86 | 0.60 | 0.21 | 1.42 | 0.24 | 0.51 | 3.23 | 4.83 | 0.84 |
| Example 4 | 1.70 | 0.81 | 0.22 | 1.47 | 0.10 | 0.43 | 3.35 | 4.50 | 0.80 |
| Example 5 | 1.29 | 0.52 | 0.22 | 1.47 | 0.09 | 0.75 | 3.05 | 4.48 | 0.80 |

FIG. 7 is a diagram illustrating the aberrations of the imaging lens according to Example 1, in which (A) shows spherical aberration, (B) shows astigmatism, (C) shows distortion, and (D) shows lateral chromatic aberration. Each of the aberration diagrams shows aberration when the d-line (wavelength: 587.56 nm) is used as the reference wavelength. The spherical aberration diagram and the lateral chromatic aberration diagram also show aberrations with respect to the F-line (wavelength: 486.13 nm), the C-line (wavelength: 656.27 nm), and the s-line (wavelength: 852.11 nm). The spherical aberration diagram also shows OSC (offence against the sine condition). In the spherical aberration diagram, Fno. indicates the F number. In the other aberration diagrams, ω indicates a half angle of view. The distortion diagram shows the amount of deviation from an ideal image height f×tan φ when the focal length of the entire lens system is f and the angle of view is φ (a variable, $0 \leq \phi \leq \omega$).

Figure 11:
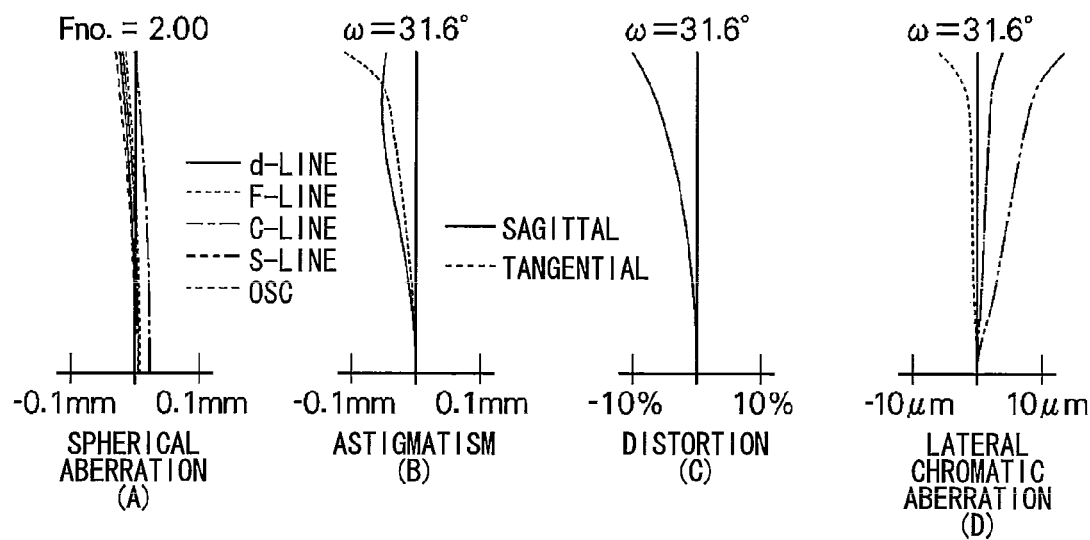
FIG. 11 is a diagram illustrating the aberrations of the imaging lens according to Example 5, in which (A) shows spherical aberration, (B) shows astigmatism, (C) shows distortion, and (D) shows lateral chromatic aberration.

Similarly, (A) to (D) of FIG. 8, (A) to (D) of FIG. 9, (A) to (D) of FIG. 10, and (A) to (D) of FIG. 11 show the spherical aberration, astigmatism, distortion, and lateral chromatic aberration of the imaging lenses according to Examples 2 to 5, respectively. As can be seen from the aberration diagrams, the aberrations of the imaging lenses according to Examples 1 to 5 are effectively corrected from a visible range to an infrared range.

Example 6

Figure 13:
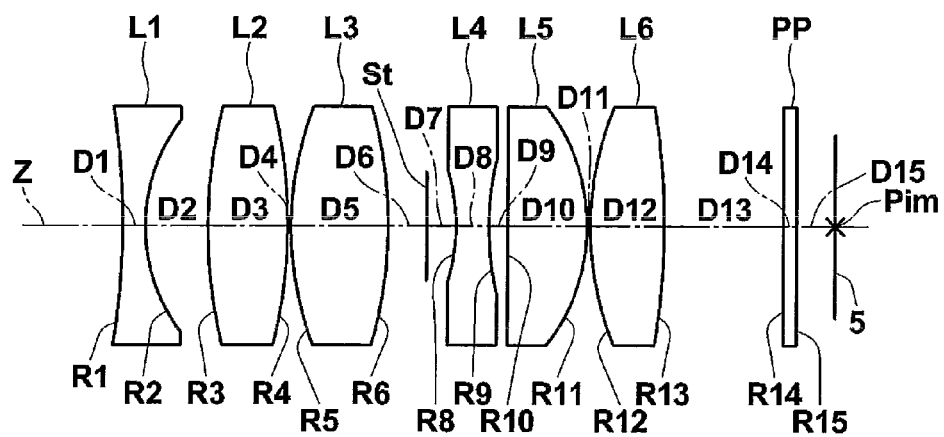
FIG. 13 is a cross-sectional view illustrating the structure of an imaging lens according to Example 6 of the invention.

The structure of an imaging lens according to Example 6 is shown in FIG. 13, and lens data and various other data are shown in Table 7.

TABLE 7

Example 6 Lens data

| Si | Ri | Di | Ndj | vdj |
|---|---|---|---|---|
| 1 | −23.77 | 0.70 | 1.7725 | 49.6 |
| 2 | 5.46 | 1.95 | | |
| 3 | 15.37 | 2.50 | 1.7880 | 47.4 |
| 4 | −15.37 | 0.10 | | |
| 5 | 10.35 | 3.00 | 1.8348 | 42.7 |
| 6 | −13.35 | 1.19 | | |
| 7 (Aperture diaphragm) | | 0.91 | | |
| 8 | −6.07 | 1.01 | 1.9229 | 18.9 |
| 9 | 8.97 | 0.57 | | |
| 10 | ∞ | 2.50 | 1.8348 | 42.7 |
| 11 | −5.99 | 0.10 | | |
| 12 | 9.68 | 2.30 | 1.5831 | 59.4 |
| 13 | −22.71 | 3.69 | | |
| 14 | ∞ | 0.40 | 1.5168 | 64.2 |
| 15 | ∞ | 1.20 | | |
| Image surface | — | | | |

Example 6 Various data

| | |
|---|---|
| Fno. | 2.00 |
| 2ω | 54.2 |
| L | 21.99 |
| Bf | 5.15 |
| f | 5.83 |
| f1 | −5.69 |
| f2 | 10.11 |
| f3 | 7.41 |
| f4 | −3.80 |
| f5 | 7.17 |
| f6 | 11.96 |
| f456 | 10.73 |
| IH | 2.8 |
| ED1 | 7.36 |

The imaging lens according to Example 6 includes a first lens L1, which is a biconcave lens, a second lens L2, which is a biconvex lens, a third lens L3, which is a biconvex lens, an aperture diaphragm St, a fourth lens L4, which is a biconcave lens, a fifth lens L5, which is a plano-convex lens having a convex surface facing an image side, and a sixth lens L6, which is a biconvex lens, arranged in this order from an object side.

Example 7

Figure 14:
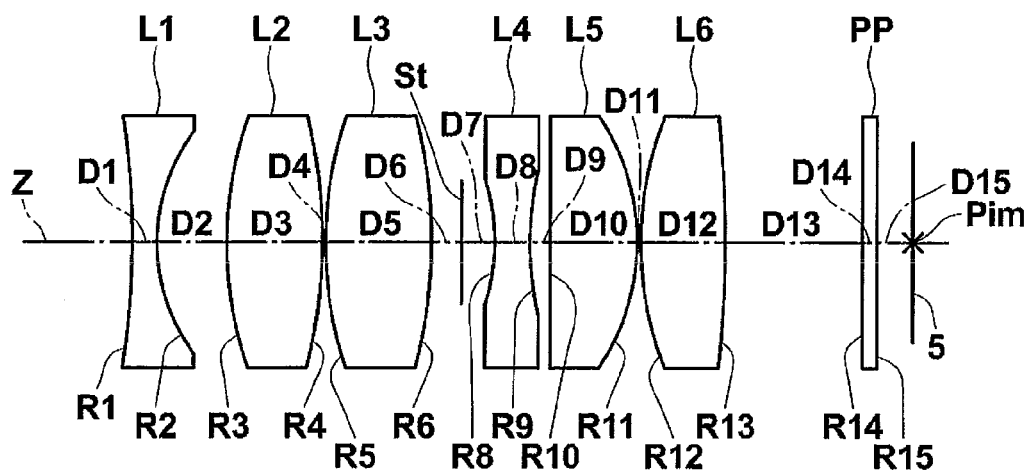
FIG. 14 is a cross-sectional view illustrating the structure of an imaging lens according to Example 7 of the invention.

The structure of an imaging lens according to Example 7 is shown in FIG. 14, and lens data and various other data are shown in Table 8. The imaging lens according to Example 7 includes a first lens L1, which is a biconcave lens, a second lens L2, which is a biconvex lens, a third lens L3, which is a biconvex lens, an aperture diaphragm St, a fourth lens L4, which is a biconcave lens, a fifth lens L5, which is a plano-convex lens having a convex surface facing an image side, and a sixth lens L6, which is a biconvex lens, arranged in this order from an object side.

TABLE 8

Example 7 Lens data

| Si | Ri | Di | Ndj | vdj |
|---|---|---|---|---|
| 1 | −23.65 | 0.70 | 1.7725 | 49.6 |
| 2 | 5.29 | 1.98 | | |
| 3 | 10.89 | 2.70 | 1.7880 | 47.4 |
| 4 | −15.39 | 0.10 | | |
| 5 | 11.35 | 3.00 | 1.8348 | 42.7 |
| 6 | −14.35 | 0.85 | | |
| 7 (Aperture diaphragm) | | 0.93 | | |
| 8 | −5.94 | 0.99 | 1.9229 | 18.9 |
| 9 | 9.40 | 0.57 | | |
| 10 | ∞ | 2.50 | 1.8830 | 40.8 |
| 11 | −6.28 | 0.10 | | |
| 12 | 9.57 | 2.40 | 1.5831 | 59.4 |
| 13 | −33.95 | 3.69 | | |
| 14 | ∞ | 0.40 | 1.5168 | 64.2 |
| 15 | ∞ | 1.20 | | |
| Image surface | — | | | |

Example 7 Various data

| | |
|---|---|
| Fno. | 2.00 |
| 2ω | 54.2 |
| L | 21.98 |
| Bf | 5.16 |
| f | 5.89 |
| f1 | −5.54 |
| f2 | 8.47 |
| f3 | 8.02 |
| f4 | −3.82 |
| f5 | 7.12 |
| f6 | 13.07 |
| f456 | 12.20 |
| IH | 2.8 |
| ED1 | 7.10 |

Example 8

Figure 15:
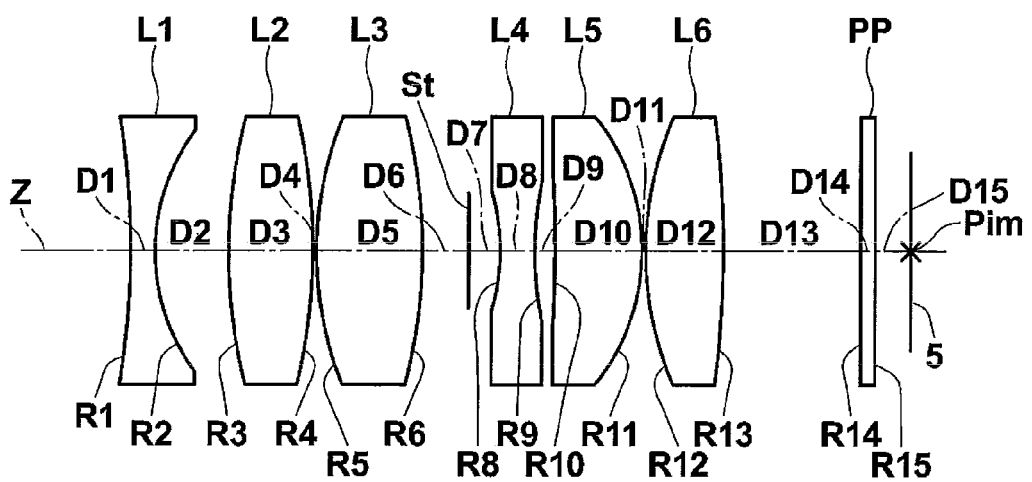
FIG. 15 is a cross-sectional view illustrating the structure of an imaging lens according to Example 8 of the invention.

The structure of an imaging lens according to Example 8 is shown in FIG. 15, and lens data and various other data are shown in Table 9. The imaging lens according to Example 8 includes a first lens L1, which is a biconcave lens, a second lens L2, which is a biconvex lens, a third lens L3, which is a biconvex lens, an aperture diaphragm St, a fourth lens L4, which is a biconcave lens, a fifth lens L5, which is a positive meniscus lens having a convex surface facing an image side, and a sixth lens L6, which is a biconvex lens, arranged in this order from an object side.

TABLE 9

Example 8 Lens data

| Si | Ri | Di | Ndj | vdj |
|---|---|---|---|---|
| 1 | −23.81 | 0.70 | 1.7550 | 52.3 |
| 2 | 5.76 | 2.09 | | |
| 3 | 15.31 | 2.40 | 1.7880 | 47.4 |
| 4 | −16.66 | 0.10 | | |
| 5 | 10.20 | 3.00 | 1.8348 | 42.7 |
| 6 | −15.14 | 1.29 | | |
| 7 (Aperture diaphragm) | | 0.89 | | |
| 8 | −6.22 | 0.98 | 1.9229 | 18.9 |
| 9 | 9.67 | 0.57 | | |
| 10 | −41.55 | 2.50 | 1.8348 | 42.7 |
| 11 | −6.01 | 0.10 | | |
| 12 | 9.60 | 2.20 | 1.7130 | 53.9 |
| 13 | −29.86 | 3.70 | | |

TABLE 9-continued

| 14 | ∞ | 0.40 | 1.5168 | 64.2 |
|----|---|------|--------|------|
| 15 | ∞ | 1.20 | | |
| Image surface | — | | | |

| Example 8 Various data | |
|---|---|
| Fno. | 2.00 |
| 2ω | 54.2 |
| L | 21.99 |
| Bf | 5.16 |
| f | 5.83 |
| f1 | −6.08 |
| f2 | 10.47 |
| f3 | 7.72 |
| f4 | −3.98 |
| f5 | 8.15 |
| f6 | 10.43 |
| f456 | 9.89 |
| IH | 2.8 |
| ED1 | 7.64 |

Example 9

Figure 16:
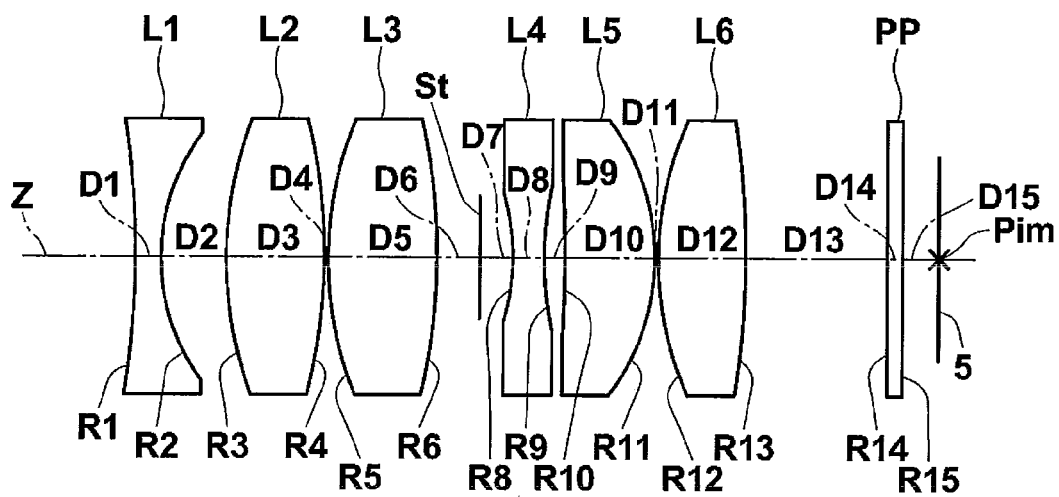
FIG. 16 is a cross-sectional view illustrating the structure of an imaging lens according to Example 9 of the invention.

The structure of an imaging lens according to Example 9 is shown in FIG. 16, and lens data and various other data are shown in Table 10. The imaging lens according to Example 9 includes a first lens L1, which is a biconcave lens, a second lens L2, which is a biconvex lens, a third lens L3, which is a biconvex lens, an aperture diaphragm St, a fourth lens L4, which is a biconcave lens, a fifth lens L5, which is a positive meniscus lens having a convex surface facing an image side, and a sixth lens L6, which is a biconvex lens, arranged in this order from an object side.

TABLE 10

| Example 9 Lens data | | | | |
|---|---|---|---|---|
| Si | Ri | Di | Ndj | νdj |
| 1 | −23.53 | 0.70 | 1.7550 | 52.3 |
| 2 | 5.74 | 1.81 | | |
| 3 | 10.92 | 2.70 | 1.7130 | 53.9 |
| 4 | −15.65 | 0.10 | | |
| 5 | 9.96 | 3.00 | 1.8348 | 42.7 |
| 6 | −16.96 | 1.17 | | |
| 7 (Aperture diaphragm) | | 0.91 | | |
| 8 | −6.10 | 0.86 | 1.9229 | 18.9 |
| 9 | 9.65 | 0.57 | | |
| 10 | −39.27 | 2.50 | 1.8830 | 40.8 |
| 11 | −6.23 | 0.10 | | |
| 12 | 9.26 | 2.40 | 1.6228 | 57.1 |
| 13 | −24.98 | 3.70 | | |
| 14 | ∞ | 0.40 | 1.5168 | 64.2 |
| 15 | ∞ | 1.20 | | |
| Image surface | — | | | |

| Example 9 Various data | |
|---|---|
| Fno. | 2.00 |
| 2ω | 50.4 |
| L | 21.98 |
| Bf | 5.16 |
| f | 6.27 |
| f1 | −6.05 |
| f2 | 9.42 |
| f3 | 7.92 |
| f4 | −3.95 |
| f5 | 8.10 |
| f6 | 11.15 |
| f456 | 11.29 |

TABLE 10-continued

| IH | 2.8 |
|---|---|
| ED1 | 7.53 |

Example 10

Figure 17:
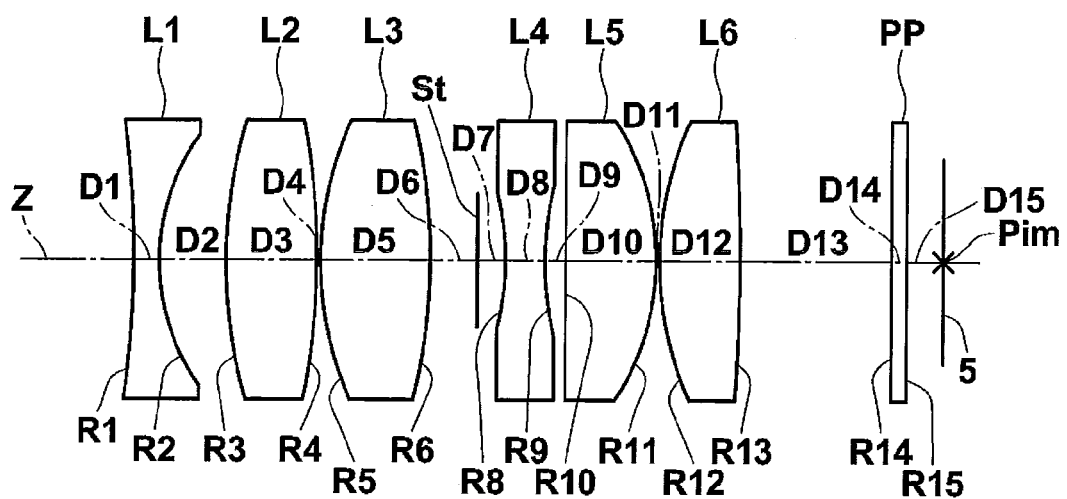
FIG. 17 is a cross-sectional view illustrating the structure of an imaging lens according to Example 10 of the invention.

The structure of an imaging lens according to Example 10 is shown in FIG. 17, and lens data and various other data are shown in Table 11. The imaging lens according to Example 10 includes a first lens L1, which is a biconcave lens, a second lens L2, which is a biconvex lens, a third lens L3, which is a biconvex lens, an aperture diaphragm St, a fourth lens L4, which is a biconcave lens, a fifth lens L5, which is a plano-convex lens having a convex surface facing an image side, and a sixth lens L6, which is a biconvex lens, arranged in this order from an object side.

TABLE 11

| Example 10 Lens data | | | | |
|---|---|---|---|---|
| Si | Ri | Di | Ndj | νdj |
| 1 | −27.54 | 0.70 | 1.7725 | 49.6 |
| 2 | 5.94 | 1.84 | | |
| 3 | 13.84 | 2.50 | 1.7880 | 47.4 |
| 4 | −19.55 | 0.10 | | |
| 5 | 9.44 | 3.00 | 1.8348 | 42.7 |
| 6 | −16.44 | 1.27 | | |
| 7 (Aperture diaphragm) | | 0.77 | | |
| 8 | −7.45 | 1.07 | 1.9229 | 18.9 |
| 9 | 8.72 | 0.57 | | |
| 10 | ∞ | 2.50 | 1.8830 | 40.8 |
| 11 | −7.00 | 0.10 | | |
| 12 | 9.30 | 2.20 | 1.5831 | 59.4 |
| 13 | −57.01 | 3.95 | | |
| 14 | ∞ | 0.40 | 1.5168 | 64.2 |
| 15 | ∞ | 1.20 | | |
| Image surface | — | | | |

| Example 10 Various data | |
|---|---|
| Fno. | 2.00 |
| 2ω | 46.8 |
| L | 22.04 |
| Bf | 5.41 |
| f | 6.77 |
| f1 | −6.27 |
| f2 | 10.63 |
| f3 | 7.58 |
| f4 | −4.22 |
| f5 | 7.93 |
| f6 | 13.88 |
| f456 | 15.39 |
| IH | 2.8 |
| ED1 | 7.53 |

Example 11

Figure 18:
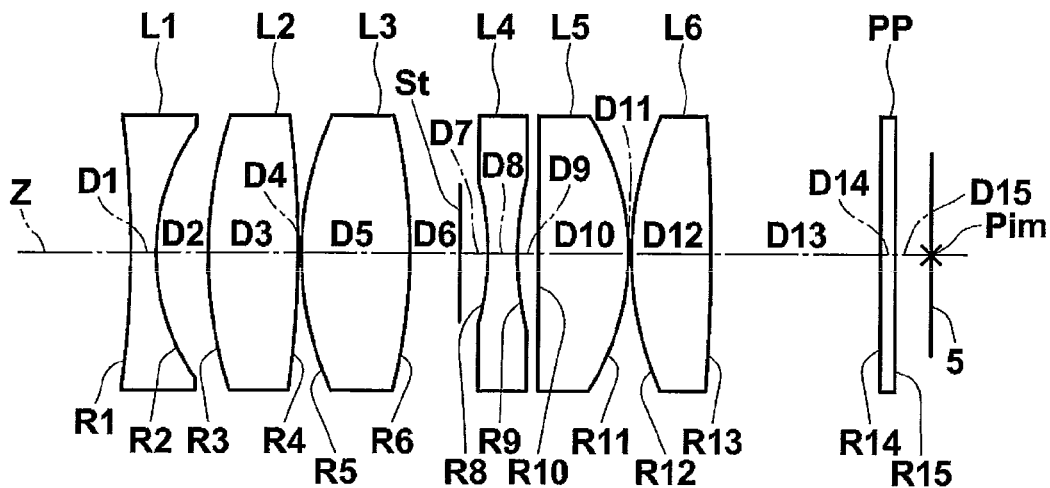
FIG. 18 is a cross-sectional view illustrating the structure of an imaging lens according to Example 11 of the invention.

The structure of an imaging lens according to Example 11 is shown in FIG. 18, and lens data and various other data are shown in Table 12. The imaging lens according to Example 11 includes a first lens L1, which is a biconcave lens, a second lens L2, which is a biconvex lens, a third lens L3, which is a biconvex lens, an aperture diaphragm St, a fourth lens L4, which is a biconcave lens, a fifth lens L5, which is a plano-convex lens having a convex surface facing an image side, and a sixth lens L6, which is a biconvex lens, arranged in this order from an object side.

TABLE 12

Example 11 Lens data

| Si | Ri | Di | Ndj | vdj |
|---|---|---|---|---|
| 1 | −28.50 | 0.70 | 1.7725 | 49.6 |
| 2 | 6.06 | 1.45 | | |
| 3 | 12.30 | 2.50 | 1.7880 | 47.4 |
| 4 | −29.09 | 0.10 | | |
| 5 | 9.20 | 3.00 | 1.8348 | 42.7 |
| 6 | −16.20 | 1.38 | | |
| 7 (Aperture diaphragm) | | 0.77 | | |
| 8 | −7.37 | 0.82 | 1.9229 | 20.9 |
| 9 | 9.41 | 0.57 | | |
| 10 | ∞ | 2.50 | 1.8830 | 40.8 |
| 11 | −7.21 | 0.10 | | |
| 12 | 9.37 | 2.20 | 1.5831 | 59.4 |
| 13 | −57.24 | 4.50 | | |
| 14 | ∞ | 0.40 | 1.5168 | 64.2 |
| 15 | ∞ | 1.20 | | |
| Image surface | — | | | |

Example 11 Various data

| | |
|---|---|
| Fno. | 2.00 |
| 2ω | 43.4 |
| L | 22.06 |
| Bf | 5.96 |
| f | 7.36 |
| f1 | −6.41 |
| f2 | 11.27 |
| f3 | 7.43 |
| f4 | −4.38 |
| f5 | 8.17 |
| f6 | 13.98 |
| f456 | 16.42 |
| IH | 2.8 |
| ED1 | 7.58 |

Example 12

Figure 19:
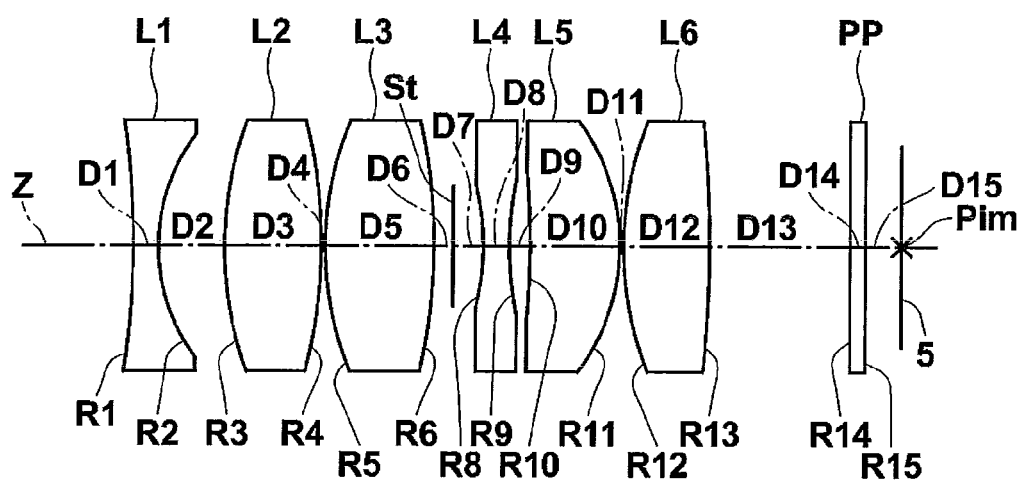
FIG. 19 is a cross-sectional view illustrating the structure of an imaging lens according to Example 12 of the invention.

The structure of an imaging lens according to Example 12 is shown in FIG. 19, and lens data and various other data are shown in Table 13. The imaging lens according to Example 12 includes a first lens L1, which is a biconcave lens, a second lens L2, which is a biconvex lens, a third lens L3, which is a biconvex lens, an aperture diaphragm St, a fourth lens L4, which is a biconcave lens, a fifth lens L5, which is a positive meniscus lens having a convex surface facing an image side, and a sixth lens L6, which is a biconvex lens, arranged in this order from an object side.

TABLE 13

Example 12 Lens data

| Si | Ri | Di | Ndj | vdj |
|---|---|---|---|---|
| 1 | −23.55 | 0.70 | 1.7550 | 52.3 |
| 2 | 5.13 | 1.85 | | |
| 3 | 10.25 | 2.70 | 1.8040 | 46.6 |
| 4 | −13.94 | 0.10 | | |
| 5 | 9.05 | 3.00 | 1.8348 | 42.7 |
| 6 | −16.05 | 0.53 | | |
| 7 (Aperture diaphragm) | | 0.83 | | |
| 8 | −6.73 | 0.72 | 2.1435 | 17.8 |
| 9 | 9.61 | 0.57 | | |
| 10 | −23.93 | 2.50 | 1.8830 | 40.8 |
| 11 | −5.80 | 0.10 | | |
| 12 | 9.38 | 2.40 | 1.7130 | 53.9 |
| 13 | −31.95 | 3.69 | | |
| 14 | ∞ | 0.40 | 1.5168 | 64.2 |
| 15 | ∞ | 1.20 | | |
| Image surface | — | | | |

Example 12 Various data

| | |
|---|---|
| Fno. | 2.00 |
| 2ω | 54.2 |
| L | 21.16 |
| Bf | 5.16 |
| f | 5.89 |
| f1 | −5.52 |
| f2 | 7.73 |
| f3 | 7.33 |
| f4 | −3.38 |
| f5 | 8.15 |
| f6 | 10.42 |
| f456 | 12.65 |
| IH | 2.8 |
| ED1 | 6.98 |

Table 14 shows values corresponding to Conditional expressions 11 to 23 in the imaging lenses according to Examples 6 to 12. In Examples 6 to 12, the d-line is used as a reference wavelength, and Table 14 shows each value at the reference wavelength. As can be seen from Table 14, Examples 6 to 12 satisfy all of Conditional expressions 11 to 23.

TABLE 14

| | Conditional expression | | | | | | |
|---|---|---|---|---|---|---|---|
| | (11) f5/f6 | (12) f2/f3 | (13) R3/f | (14) L/f | (15) f5/f | (16) \|f1/f2\| | (17) f456/f |
| Example 6 | 0.60 | 1.36 | 2.64 | 3.77 | 1.23 | 0.56 | 1.84 |
| Example 7 | 0.54 | 1.06 | 1.85 | 3.73 | 1.21 | 0.65 | 2.07 |
| Example 8 | 0.78 | 1.36 | 2.62 | 3.77 | 1.40 | 0.58 | 1.70 |
| Example 9 | 0.73 | 1.19 | 1.74 | 3.50 | 1.29 | 0.64 | 1.80 |
| Example 10 | 0.57 | 1.40 | 2.04 | 3.25 | 1.17 | 0.59 | 2.27 |
| Example 11 | 0.58 | 1.52 | 1.67 | 3.00 | 1.11 | 0.57 | 2.23 |
| Example 12 | 0.78 | 1.05 | 1.74 | 3.59 | 1.38 | 0.71 | 2.15 |

| | Conditional expression | | | | | |
|---|---|---|---|---|---|---|
| | (18) Bf/f | (19) f2/f | (20) \|R8/R9\| | (21) \|R4/f\| | (22) Bf/(L − Bf) | (23) ED1/IH |
| Example 6 | 0.88 | 1.73 | 0.68 | −2.64 | 0.31 | 2.63 |
| Example 7 | 0.88 | 1.44 | 0.63 | −2.61 | 0.31 | 2.53 |
| Example 8 | 0.89 | 1.79 | 0.64 | −2.85 | 0.31 | 2.73 |
| Example 9 | 0.82 | 1.50 | 0.63 | −2.50 | 0.31 | 2.69 |
| Example 10 | 0.80 | 1.57 | 0.86 | −2.89 | 0.33 | 2.69 |
| Example 11 | 0.81 | 1.53 | 0.78 | −3.95 | 0.37 | 2.71 |
| Example 12 | 0.88 | 1.31 | 0.70 | −2.37 | 0.32 | 2.49 |

Figure 20:
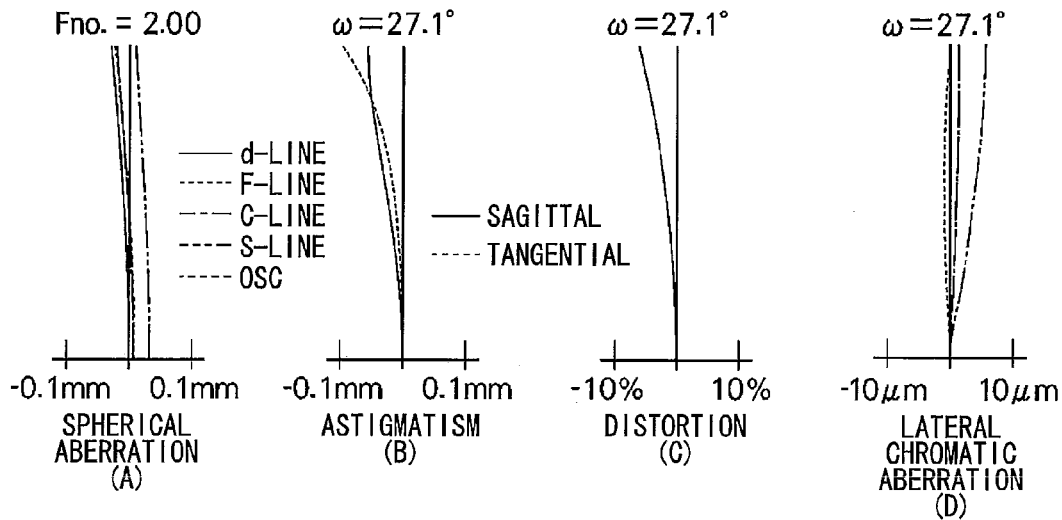
FIG. 20 is a diagram illustrating the aberrations of the imaging lens according to Example 6, in which (A) shows spherical aberration, (B) shows astigmatism, (C) shows distortion, and (D) shows lateral chromatic aberration.

FIG. 20 is a diagram illustrating the aberrations of the imaging lens according to Example 6, in which (A) shows spherical aberration, (B) shows astigmatism, (C) shows distortion, and (D) shows lateral chromatic aberration. Each of the aberration diagrams shows aberration when the d-line (wavelength: 587.56 nm) is used as the reference wavelength. The spherical aberration diagram and the lateral chromatic aberration diagram also show aberrations with respect to the F-line (wavelength: 486.13 nm), the C-line (wavelength: 656.27 nm), and the s-line (wavelength: 852.11 nm). The spherical aberration diagram also shows OSC (offence against the sine condition). In the spherical aberration diagram, Fno. indicates the F number. In the other aberration diagrams, ω indicates a half angle of view. The distortion diagram shows the amount of deviation from an ideal image height f×tan φ when the focal length of the entire lens system is f and an angle of view is φ (a variable, 0≦φ≦ω).

Figure 21:
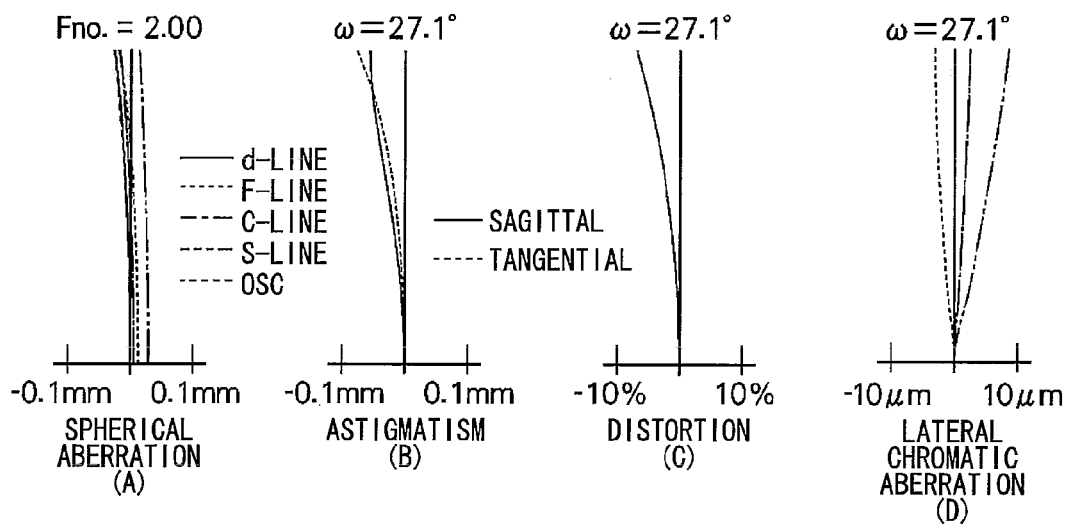
FIG. 21 is a diagram illustrating the aberrations of the imaging lens according to Example 7, in which (A) shows spherical aberration, (B) shows astigmatism, (C) shows distortion, and (D) shows lateral chromatic aberration.
Figure 22:
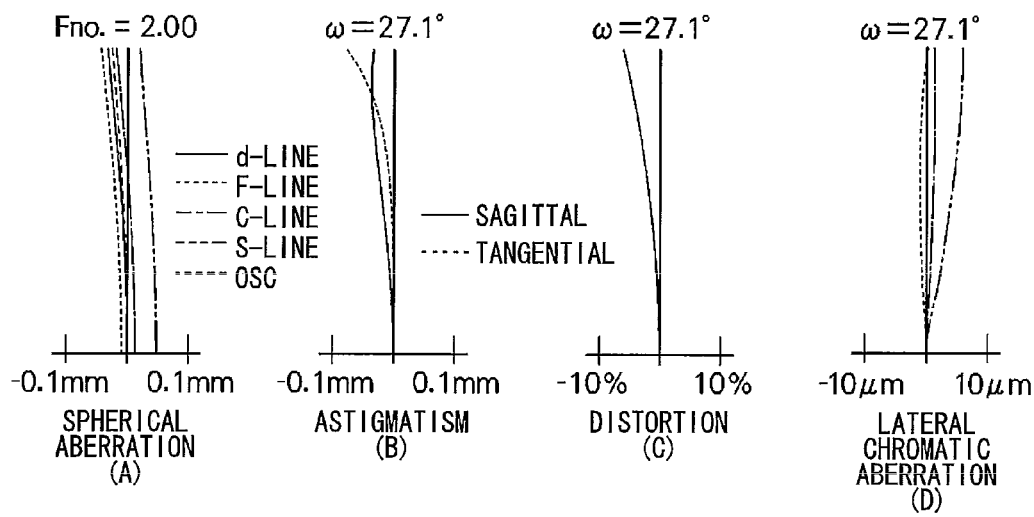
FIG. 22 is a diagram illustrating the aberrations of the imaging lens according to Example 8, in which (A) shows spherical aberration, (B) shows astigmatism, (C) shows distortion, and (D) shows lateral chromatic aberration.
Figure 23:
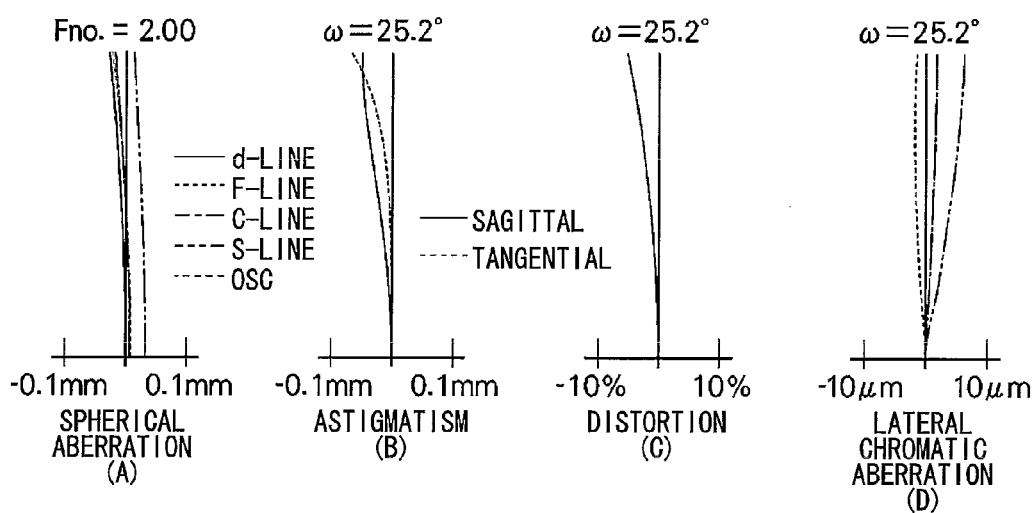
FIG. 23 is a diagram illustrating the aberrations of the imaging lens according to Example 9, in which (A) shows spherical aberration, (B) shows astigmatism, (C) shows distortion, and (D) shows lateral chromatic aberration.
Figure 24:
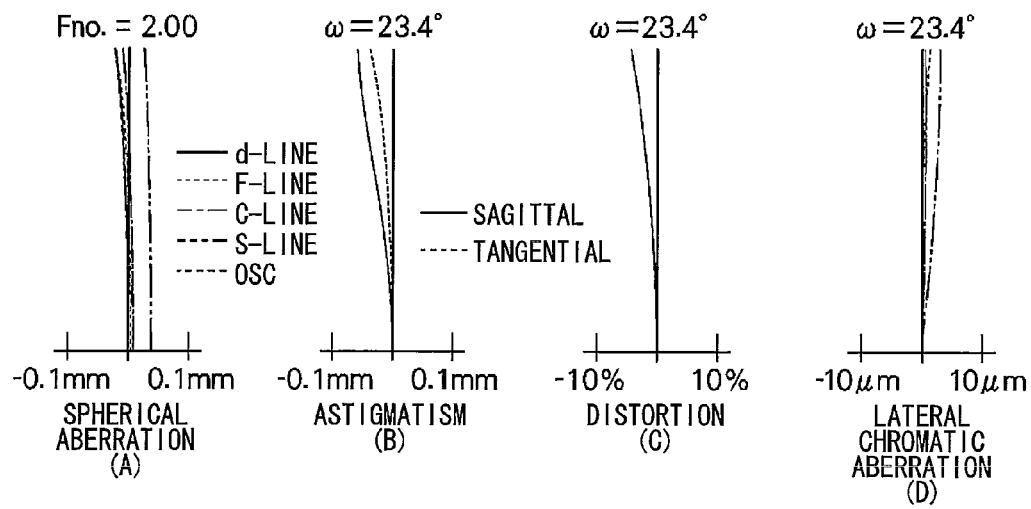
FIG. 24 is a diagram illustrating the aberrations of the imaging lens according to Example 10, in which (A) shows spherical aberration, (B) shows astigmatism, (C) shows distortion, and (D) shows lateral chromatic aberration.
Figure 25:
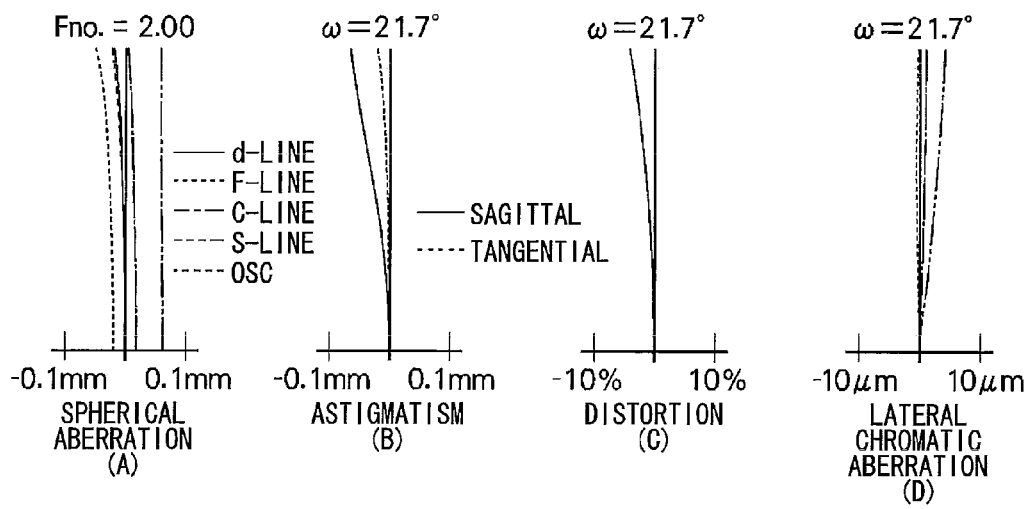
FIG. 25 is a diagram illustrating the aberrations of the imaging lens according to Example 11, in which (A) shows spherical aberration, (B) shows astigmatism, (C) shows distortion, and (D) shows lateral chromatic aberration.
Figure 26:
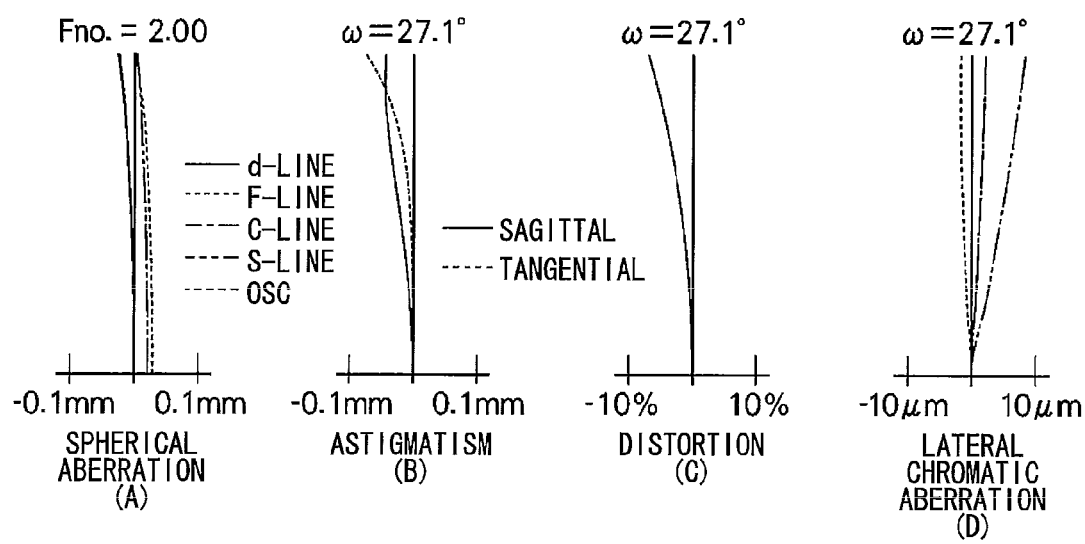
FIG. 26 is a diagram illustrating the aberrations of the imaging lens according to Example 12, in which (A) shows spherical aberration, (B) shows astigmatism, (C) shows distortion, and (D) shows lateral chromatic aberration.

Similarly, (A) to (D) of FIG. 21, (A) to (D) of FIG. 22, (A) to (D) of FIG. 23, (A) to (D) of FIG. 24, (A) to (D) of FIG. 25, and (A) to (D) of FIG. 26 show the spherical aberration, astigmatism, distortion, and lateral chromatic aberration of the imaging lenses according to Examples 7 to 12, respectively. As can be seen from the aberration diagrams, the aberrations of the imaging lenses according to Examples 6 to 12 are effectively corrected from a visible range to an infrared range.

The imaging lenses according to Examples 1 to 12 each have a six-lens structure, and all the six lenses are single spherical lenses without including any cemented lens. Therefore, it is possible to manufacture the imaging lens with a low cost. In addition, the imaging lenses according to Examples 1 to 12 each have a small size, a wide angle of view, a high optical performance, and a small F number of 2.0, and effectively correct aberrations from a visible range to an infrared range. Therefore, the imaging lenses can be appropriately used for a monitoring camera or an in-vehicle camera for capturing, for example, the front, side, and rear images of a vehicle.

Figure 27:
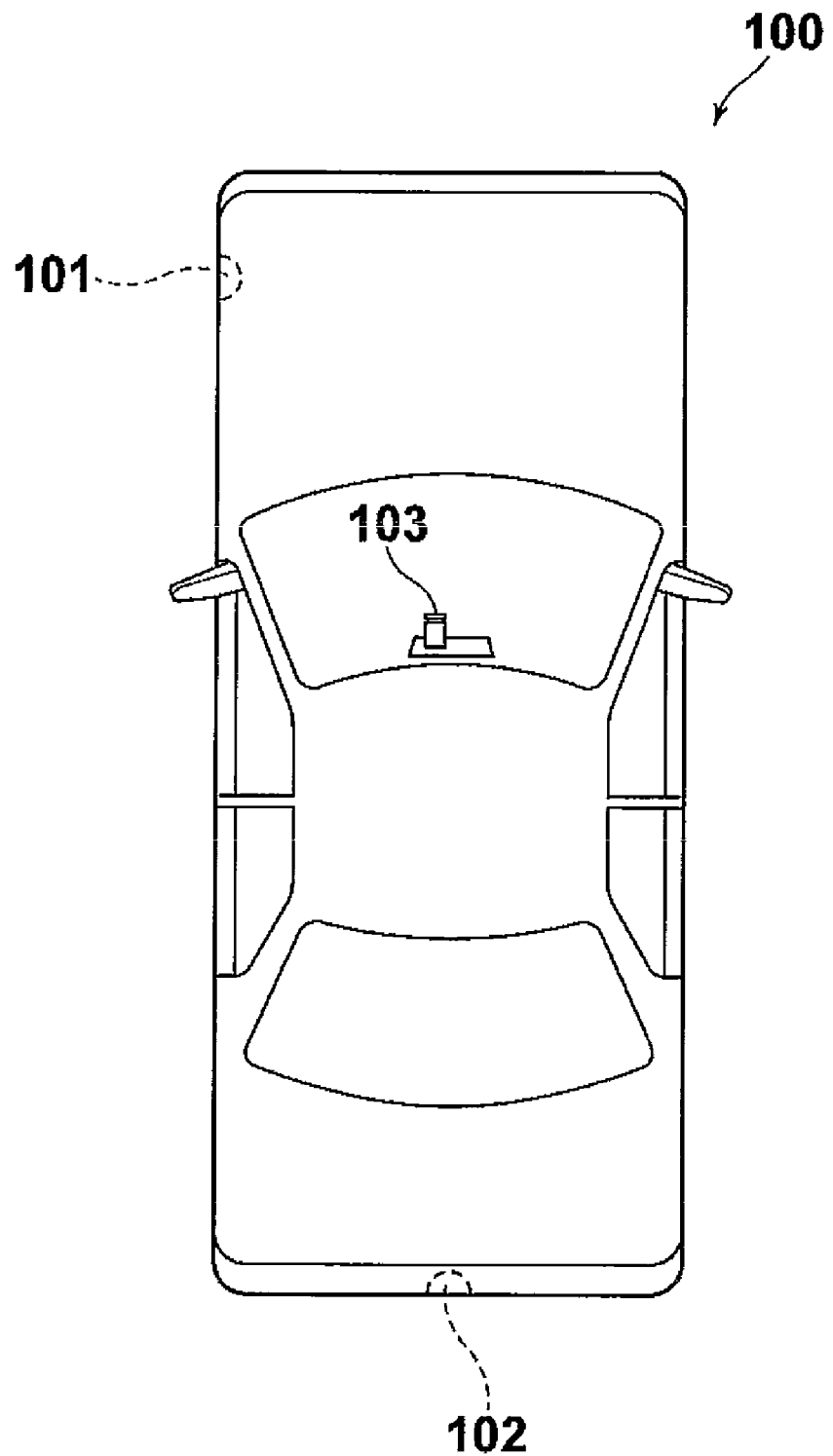
FIG. 27 is a diagram illustrating the arrangement of in-vehicle imaging apparatuses according to another embodiment of the invention.

FIG. 27 shows an example in which an imaging apparatus including the imaging lens according to this embodiment is provided in a vehicle 100. In FIG. 27, the vehicle 100 includes an outside camera 101 that captures the image of a passenger side blind spot, an outside camera 102 that captures the image of a blind spot on the rear side of the vehicle 100, and an inside camera 103 that is mounted to the rear surface of a room mirror and captures an image in the same visible range as that of a driver. Each of the outside camera 101, the outside camera 102, and the inside camera 103 is the imaging apparatus according to this embodiment of the invention, and includes the imaging lens according to each of the above-mentioned examples of the invention and an imaging device that converts an optical image formed by the imaging lens into electric signals.

Since each of the imaging lenses according to the above-mentioned examples of the invention has the above-mentioned advantages, each of the outside cameras 101 and 102 and the inside camera 103 can be manufactured at a low cost and with a small size, and it is possible to form a high-quality image on the imaging surface of the imaging device.

Although the embodiment and the examples of the invention have been described above, the invention is not limited to the embodiment and the examples, but various modifications and changes of the invention can be made. For example, the curvature radius, surface spacing, refractive index, and Abbe number of each lens component are not limited to the values of the above-described numerical examples, but each lens component may have other values.

Further, in the above-described embodiment of the invention, the imaging apparatus is applied to an in-vehicle camera, but the invention is not limited thereto. For example, the invention may be applied to a mobile terminal camera or a monitoring camera.

What is claimed is:

1. An imaging lens comprising:
a first lens that has a negative power and includes a concave surface facing an image side;
a second lens having a positive power;
a third lens having a positive power;
a stop;
a fourth lens that is a biconcave lens having a negative power;
a fifth lens that has a positive power and includes a convex surface facing the image side; and
a sixth lens that has a positive power and includes a convex surface facing an object side,
wherein the first to sixth lenses are arranged in this order from the object side,
the absolute value of the curvature radius of an object-side surface of the second lens is greater than that of the curvature radius of an image-side surface thereof,
the Abbe number of a material forming the fourth lens with respect to the d-line is equal to or less than 30, and
when the focal length of the entire lens system is f and a composite focal length from the fourth lens to the sixth lens is f456, the imaging lens satisfies the following conditional expression:

$1.00 < f456/f < 1.88$.

2. The imaging lens according to claim 1,
wherein the absolute value of the curvature radius of an object-side surface of the third lens is less than that of the curvature radius of an image-side surface thereof,
the absolute value of the curvature radius of an object-side surface of the fifth lens is greater than that of the curvature radius of an image-side surface thereof, and
the absolute value of the curvature radius of an object-side surface of the sixth lens is less than that of the curvature radius of an image-side surface thereof.

3. The imaging lens according to claim 1,
wherein, when the curvature radius of an object-side surface of the fourth lens is R8 and the curvature radius of an image-side surface of the fourth lens is R9, the imaging lens satisfies the following conditional expression:

$0.30 < |R8/R9| < 0.90$.

4. The imaging lens according to claim 1,
wherein, when a distance from an object-side surface of a lens closest to the object side to an image surface on an optical axis is L and a distance from an image-side surface of a lens closest to the image side to the image surface on the optical axis is Bf, the imaging lens satisfies the following conditional expression:

$0.15 < Bf/(L-Bf) < 0.25$.

5. The imaging lens according to claim 1,
wherein, when the focal length of the entire lens system is f and the focal length of the fifth lens is f5, the imaging lens satisfies the following conditional expression:

$1.20 < f5/f < 1.50$.

6. The imaging lens according to claim 1,
wherein, when an air space between the third lens and the stop on the optical axis is D6 and an air space between the stop and the fourth lens on the optical axis is D7, the imaging lens satisfies the following conditional expression:

$0.3 < D6/D7 < 1.2$.

7. The imaging lens according to claim 1,
wherein, when the focal length of the first lens is f1 and the focal length of the second lens is f2, the imaging lens satisfies the following conditional expression:

$0.3 < |f1/f2| < 1.0$.

8. An imaging apparatus comprising the imaging lens according to claim 1.

9. An imaging lens comprising:
a first lens that has a negative power and includes a concave surface facing an image side;
a second lens that is a biconvex lens having a positive power;

a third lens having a positive power;
a stop;
a fourth lens that is a biconcave lens having a negative power;
a fifth lens that has a positive power and includes a convex surface facing the image side; and
a sixth lens that has a positive power and includes a convex surface facing an object side,
wherein the first to sixth lenses are arranged in this order from the object side,
the absolute value of the curvature radius of an object-side surface of the second lens is equal to or less than that of the curvature radius of an image-side surface thereof,
the absolute value of the curvature radius of an object-side surface of the third lens is equal to or less than that of the curvature radius of an image-side surface thereof,
the Abbe number of a material forming the second lens with respect to the d-line is equal to or greater than 45, and
the Abbe number of a material forming the fourth lens with respect to the d-line is equal to or less than 30.

10. The imaging lens according to claim 9,
wherein the first lens is a biconcave lens,
the absolute value of the curvature radius of an object-side surface of the first lens is greater than that of the curvature radius of an image-side surface thereof,
the absolute value of the curvature radius of an object-side surface of the fifth lens is greater than that of the curvature radius of an image-side surface thereof, and
the absolute value of the curvature radius of an object-side surface of the sixth lens is less than that of the curvature radius of an image-side surface thereof.

11. The imaging lens according to claim 9,
wherein, when the focal length of the fifth lens is f5 and the focal length of the sixth lens is f6, the imaging lens satisfies the following conditional expression:

$0.30 < f5/f6 < 0.95.$

12. The imaging lens according to claim 9,
wherein, when the focal length of the second lens is f2 and the focal length of the third lens is f3, the imaging lens satisfies the following conditional expression:

$0.50 < f2/f3 < 1.80.$

13. The imaging lens according to claim 9,
wherein, when the focal length of the entire lens system is f and the curvature radius of the object-side surface of the second lens is R3, the imaging lens satisfies the following conditional expression:

$0.5 < R3/f < 4.0.$

14. The imaging lens according to claim 9,
wherein, when the focal length of the entire lens system is f and a distance from an object-side surface of lens closest to the object side to an image surface on an optical axis is L, the imaging lens satisfies the following conditional expression:

$2.0 < L/f < 7.0.$

15. The imaging lens according to claim 9,
wherein the refractive index of a material forming the second lens with respect to the d-line is in the range of 1.65 to 1.9.

16. The imaging lens according to claim 9,
wherein, when the focal length of the entire lens system is f and the focal length of the fifth lens is f5, the imaging lens satisfies the following conditional expression:

$0.8 < f5/f < 1.6.$

17. The imaging lens according to claim 9,
wherein, when the focal length of the first lens is f1 and the focal length of the second lens is f2, the imaging lens satisfies the following conditional expression:

$0.3 < |f1/f2| < 1.0.$

18. The imaging lens according to claim 9,
wherein, when the focal length of the entire lens system is f and a composite focal length from the fourth lens to the sixth lens is f456, the imaging lens satisfies the following conditional expression:

$1.50 < f456/f < 2.50.$

19. An imaging apparatus comprising the imaging lens according to claim 9.

* * * * *